(12) United States Patent
Harada et al.

(10) Patent No.: US 7,842,378 B2
(45) Date of Patent: Nov. 30, 2010

(54) ENERGY ABSORBER AND METHOD FOR MANUFACTURING THE SAME

(75) Inventors: Ryo Harada, Kariya (JP); Makoto Tsuzuki, Kariya (JP); Ryuta Kamiya, Kariya (JP); Aya Nishimoto, Kariya (JP); Ryohei Tsuji, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 855 days.

(21) Appl. No.: 11/026,107

(22) Filed: Dec. 30, 2004

(65) Prior Publication Data

US 2005/0147804 A1 Jul. 7, 2005

(30) Foreign Application Priority Data

| Jan. 6, 2004 | (JP) | ............................. 2004-001275 |
| Jan. 7, 2004 | (JP) | ............................. 2004-002304 |
| Jan. 9, 2004 | (JP) | ............................. 2004-004602 |

(51) Int. Cl.
*D04H 1/00* (2006.01)
*B32B 3/04* (2006.01)
*B60R 21/16* (2006.01)

(52) U.S. Cl. .................... 428/292.1; 428/137; 428/36.1
(58) Field of Classification Search .............. 428/292.1, 428/36.1, 137
See application file for complete search history.

(56) References Cited

U.S. PATENT DOCUMENTS

| 4,542,925 A | 9/1985 | Huber et al. ................. 293/120 |
| 4,749,613 A | 6/1988 | Yamada et al. .............. 428/286 |
| 4,856,833 A | 8/1989 | Beekman ..................... 293/120 |
| 5,419,416 A | 5/1995 | Miyashita et al. ........... 188/371 |
| 6,406,088 B1 | 6/2002 | Tate ....................... 296/187.03 |
| 6,705,653 B2 | 3/2004 | Gotanda et al. |
| 6,830,286 B2 * | 12/2004 | Bechtold et al. ....... 296/187.03 |

(Continued)

FOREIGN PATENT DOCUMENTS

EP 0 502 648 A1 9/1992

(Continued)

OTHER PUBLICATIONS

Japanese Office Action dated May 15, 2007, received in corresponding Japanese Patent Application No. 2004-001275 without English translation.

(Continued)

*Primary Examiner*—D. Lawrence Tarazano
*Assistant Examiner*—Camie S Thompson
(74) *Attorney, Agent, or Firm*—Locke Lord Bissell & Liddell LLP

(57) ABSTRACT

An energy absorber is crushed upon receiving compressive load, thereby absorbing energy. The energy absorber has a first end and a second end with respect to a direction of the compressive load. The energy absorber is formed of fiber-reinforced resin. The fiber-reinforced resin includes a stack of fiber layers having a compression direction fiber layer. The compression direction fiber layer includes fiber bundles of filament fibers. The fiber bundles are arranged such that the extending direction of the fiber bundles has a component of the direction of the compressive load. The density of the fiber bundles is gradually increased from the first end to the second end. Therefore, compressive load required for crushing is prevented from increasing at an early stage of crushing.

17 Claims, 14 Drawing Sheets

U.S. PATENT DOCUMENTS

| | | |
|---|---|---|
| 6,840,542 B2 | 1/2005 | Kim |
| 2003/0189343 A1 | 10/2003 | Evans et al. ............... 293/120 |
| 2004/0201252 A1 | 10/2004 | Bechtold et al. ....... 296/187.03 |
| 2004/0247845 A1* | 12/2004 | Abe et al. ................... 428/223 |

FOREIGN PATENT DOCUMENTS

| | | |
|---|---|---|
| EP | 1 316 409 A1 | 6/2003 |
| FR | 2 761 434 | 10/1998 |
| JP | 49-9576 | 1/1974 |
| JP | 55-014205 | 1/1980 |
| JP | 61-9376 | 1/1986 |
| JP | 02-221440 | 9/1990 |
| JP | 04-310447 | 11/1992 |
| JP | 8-218249 | 8/1993 |
| JP | 06-114830 | 4/1994 |
| JP | 06-264949 | 9/1994 |
| JP | 06-346935 | 12/1994 |
| JP | 07-217689 | 8/1995 |
| JP | 07-331556 | 12/1995 |
| JP | 8-177922 | 7/1996 |
| JP | 09-117964 | 5/1997 |
| JP | 09-216225 | 8/1997 |
| JP | 2000-178855 | 6/2000 |
| JP | 2001-080439 | 3/2001 |
| JP | 2001-208120 | 8/2001 |
| WO | WO 02/04198 A1 | 1/2002 |

OTHER PUBLICATIONS

Japanese Office Action dated May 15, 2007, received in corresponding Japanese Patent Application No. 2004-002304 without English translation.

Japanese Office Action dated May 29, 2007, received in corresponding Japanese Patent Application No. 2004-004602 without English translation.

* cited by examiner

Fig.14(a)   Fig.14(b)
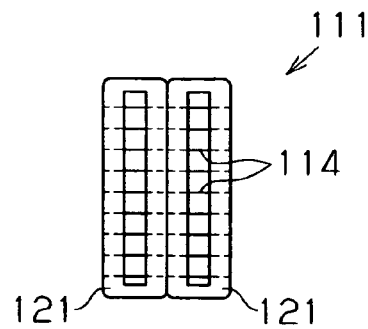 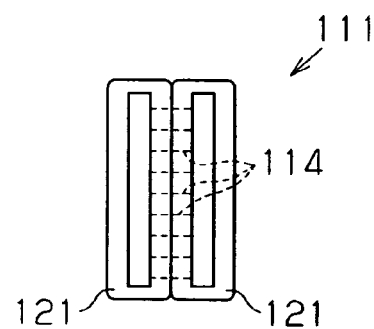
Fig.15(a)   Fig.15(b)
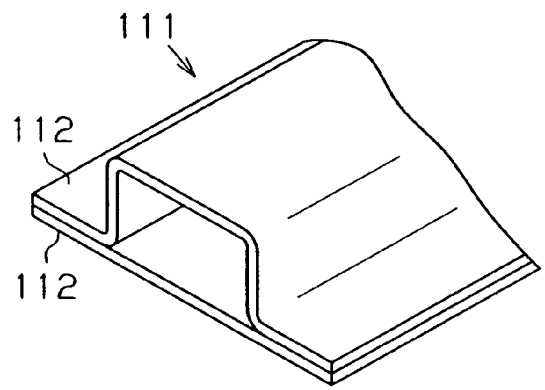 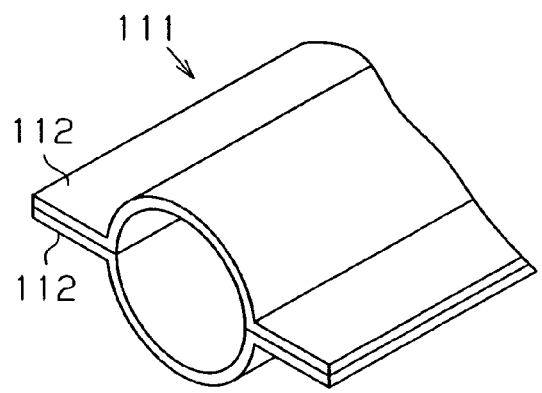
Fig.16(a)   Fig.16(b)   Fig.17
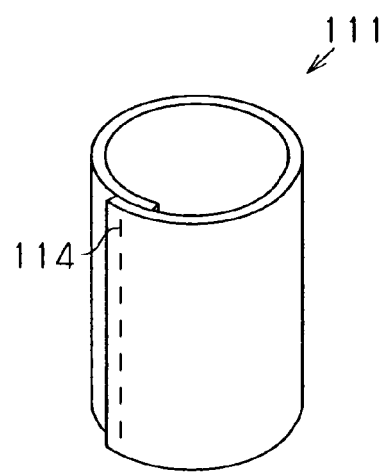 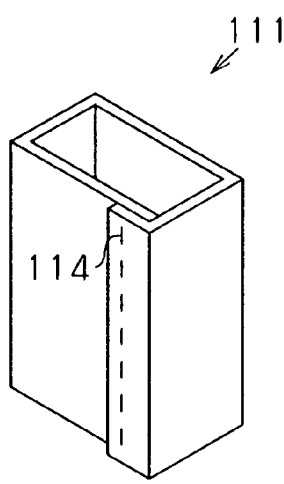 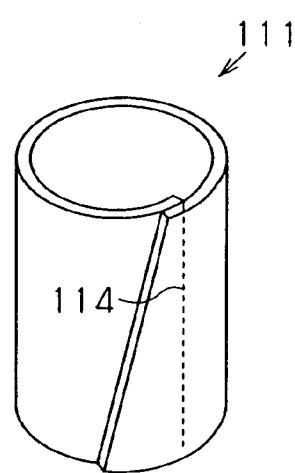

Fig.18
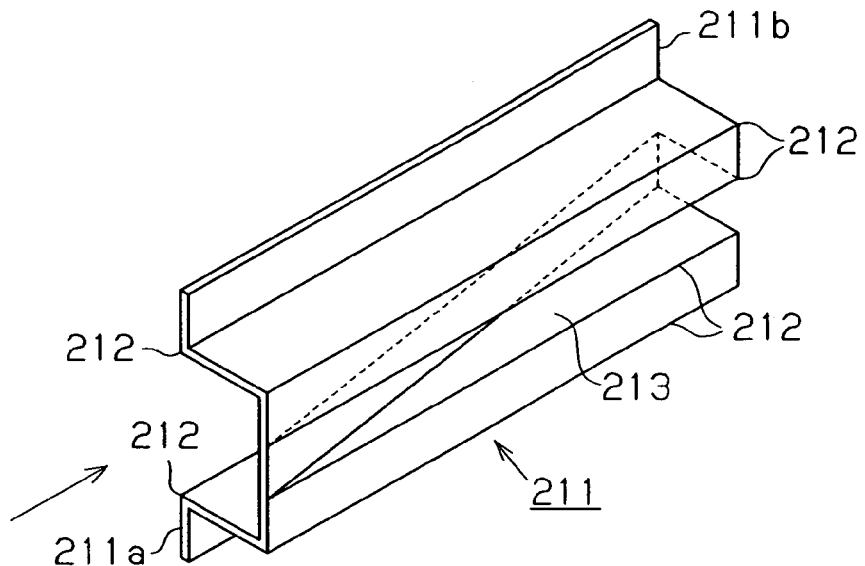
Fig.19(a)    Fig.19(b)    Fig.19(c)
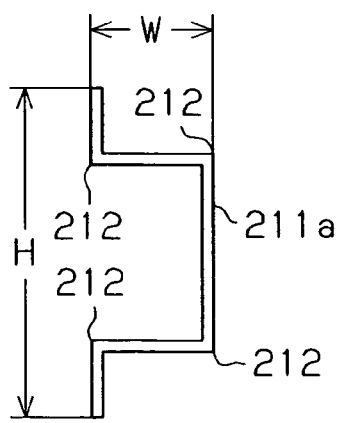 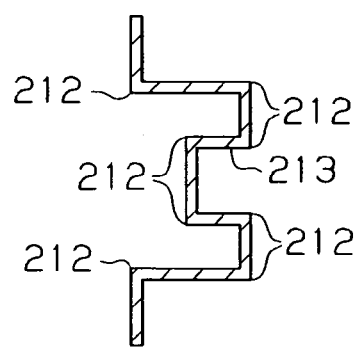 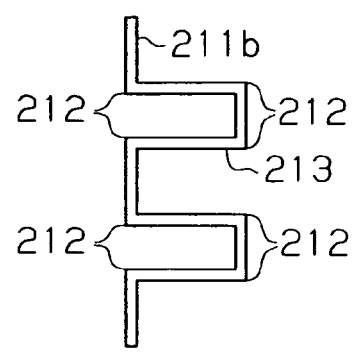

ENERGY ABSORBER AND METHOD FOR MANUFACTURING THE SAME

BACKGROUND OF THE INVENTION

The present invention relates an energy absorber and a method for manufacturing the same. More particularly, the present invention pertains to a fiber-reinforced resin energy absorber that is located in a position to which impact is applied and to a method for manufacturing the energy absorber.

Energy absorbers are often provided in portions of a vehicle body that receive impacts, such as a front portion and a rear portion. An energy absorber is deformed when receiving impact, and is crushed to absorb energy. For example, a front side member and a rear side member of a vehicle each play a key role as an impact energy absorbing member (energy absorber). Using metal for energy absorbers increases the weight. Thus, to reduce the weight, energy absorbers are formed of fiber-reinforced resin.

Characteristics desired for such energy absorbers include the ability to be gradually crushed to stably absorb energy without significantly increasing the load required for crushing at an early stage of deformation. Among energy absorbers that have such characteristics, is there an energy absorber disclosed in U.S. Pat. No. 6,406,088. The thickness of this energy absorber is reduced toward the distal end in a direction along which compressive load is applied. FIG. 26 shows an energy absorber 61 disclosed in the publication. The energy absorber 61 is shaped like a rectangular tube. The thickness of a wall 61a is reduced toward the distal end and increases toward the proximal end (base). FIG. 27 shows a structure for varying the thickness of the wall 61a. In the structure shown in FIG. 27, reinforcing fibers of fiber-reinforced resin forming the energy absorber 61 are formed into layers of laminated fibers. In the layers, fiber bundles 62 extend in a direction along which a compressive load is applied to the energy absorber 61. The fiber bundles 62 have different lengths along the direction of compressive load.

The energy absorber 61 of the above patent publication is made of fiber-reinforced resin. The layers of the fiber bundles 62 having different lengths along the direction of compressive load applied to the energy absorber 61 are laminated. That is, the reinforcing fibers are formed of laminated fibers. This structure complicates the arrangement of the fibers. This is because, to laminate layers of fiber bundles 62 having different lengths, fiber bundles 62 that have been cut to predetermined variation of lengths must be prepared, and it is difficult to place each fiber bundle 62 while maintaining it in a linearly extending state.

FIG. 28 illustrates another energy absorber 41 of this type. The energy absorber 41 is cylindrical as shown in FIG. 28 and is made of fiber-reinforced resin. As reinforcing fibers, short fibers, long fibers, glass fibers, carbon fibers are used in combination as necessary (see Japanese Laid-Open Patent Publication 8-177922). A tapered portion 42 is formed at the distal end of the energy absorber 41. A θ fiber portion 43 is provided inside the energy absorber 41. A glass fiber portion 44 is provided about a distal portion of the θ fiber portion 43. A carbon fiber portion 45 is provided outside a proximal portion of the θ fiber portion 43. The θ fiber portion 43 has fibers arranged to be inclined by angle θ in positive and negative directions with respect to the axial direction of the cylinder. At a middle section of the θ fiber portion, the glass fiber portion 44 and the carbon fiber portion 45 are overlaid on each other. At an initial stage of a collision of the energy absorber 41, only the θ fiber portion 43 contributes to increase the crushing load. Also, because of the tapered portion 42, crushing starts at a relatively low load. Thereafter, the load required for crushing the section at which the glass fiber portion 44 and the carbon fiber portion 45 are overlaid on each other is increased, and the energy absorption amount is increased accordingly. As the crushing progresses further, the load required for crushing the carbon fiber portion 45 is further increased, which further increases the energy absorption amount.

In some types of fiber-reinforced resin that have fiber layers each having fiber bundles formed of filament fibers (continuous fibers), the fibers (fiber bundles) in each layer are arranged perpendicular to the fibers (fiber bundles) of other layers (arranged angles of the fibers are 0 degrees and 90 degrees). Such a fiber-reinforced resin has a higher strength compared to a fiber-reinforced resin having short fibers as reinforcing fibers. This type of fiber-reinforced resin (two-dimensional laminated fiber structure) is formed by laminating prepregs each having fiber bundles extending in a single direction, such that the directions of the fibers are different from one prepreg to another, and then hardening the resin.

When a force is applied to a two-dimensional laminated fiber structure along a direction perpendicular to its thickness, cracks are formed in a center portion along the thickness, which creates interlayer cracks. Therefore, if a two-dimensional laminated fiber structure is used to form an energy absorber, when the energy absorber is compressed, the property of resin between layers affects the energy absorption. This hampers the energy absorber from exerting the advantages of reinforcing fibers.

The energy absorber 41 shown in FIG. 28 uses various types of reinforcing fibers. That is, fiber materials are arranged such that the strength of the materials increases from an end at which crushing of the energy absorber 41 starts to the other end. Accordingly, a desired load-displacement variation is obtained. In this case, since compressive load required for crushing increases as crushing progresses along the axial direction of the energy absorber 41, the energy absorption amount can be increased compared to a case where reinforcing fibers of a single type are used. However, since a plurality of types fibers need to be prepared, the manufacture is troublesome. Further, no measures are taken against a rapid progress of cracks between adjacent fiber layers.

SUMMARY OF THE INVENTION

Accordingly, it is an objective of the present invention to provide an energy absorber that prevents compressive load required for crushing from increasing at an early stage of crushing, stably absorbs energy, and increases the amount of absorbed energy. Another objective of the present invention is to provide a method for easily manufacturing the above energy absorber.

Further, it is an objective of the present invention to provide an energy absorber that increases the energy absorption power with a several percent of weight increase or less compared to a conventional energy absorber using a two-dimensional laminated fiber structure.

It is also an objective of the present invention to provide an energy absorber that prevents reaction force of the energy absorber from increasing at an early stage of crushing without using a two or more types of reinforcing fibers, and increases the energy absorption amount.

To achieve the above-mentioned objective, the present invention provides an energy absorber that is crushed upon receiving compressive load, thereby absorbing energy. The energy absorber has a first end and a second end with respect to a direction of the compressive load. The energy absorber is formed of fiber-reinforced resin. The fiber-reinforced resin includes a stack of fiber layers having a compression direction fiber layer. The compression direction fiber layer includes fiber bundles of filament fibers. The fiber bundles are arranged such that the extending direction of the fiber bundles has a component of the direction of the compressive load. The density of the fiber bundles is gradually increased from the first end to the second end.

Another aspect of the present invention provides an energy absorber formed of fiber-reinforced resin that contains a stack of fiber layers. The stack of fiber layers includes a compression direction fiber layer and an intersecting fiber layer. The intersecting fiber layer is formed of fiber bundles of filament fibers. The fiber bundles forming the intersecting fiber layer are arranged such that the extending direction of the fiber bundles intersects the direction of the compressive load. At least one of the density of the fiber bundles forming the compression direction fiber layer and the density of the fiber bundles forming the intersecting fiber layer gradually increases from the first end toward the second end.

Another aspect of the present invention provides an energy absorber formed of fiber-reinforced resin having a fiber structure. The fiber structure includes a stack of fiber layers in which fiber bundles of filament fibers are arranged to have a biaxial structure. Binding threads are arranged to extend through the thickness of the stack of fiber layers.

Another aspect of the present invention provides an energy absorber having a portion in which a cross-sectional shape perpendicular to the direction of a compressive load changes along the direction of the compressive load. Load required for crushing the portion varies according to each position along the direction of the compressive load.

Another aspect of the present invention provides a method for manufacturing an energy absorber. The method includes preparing a support that has supporting members. The supporting members are arranged at a predetermined pitch. Fiber bundles are engaged with the supporting members such that the fiber bundles are arranged in a folded state, thereby forming a stack of fiber layers formed of a plurality of laminated fiber layers. The fiber layers includes a compression direction fiber layer and an intersecting fiber layer. The compression direction fiber layer is formed of fiber bundles that are arranged such that the extending direction of the fiber bundles has a component of the direction of the compressive load. The intersecting fiber layer is formed of fiber bundles that are arranged such that the extending direction of the fiber bundles is perpendicular to the direction of the compressive load. At least one of the density of the fiber bundles forming the compression direction fiber layer and the density of the fiber bundles forming the intersecting fiber layer gradually increases from the first end toward the second end. A shape maintaining process is performed for the stack of fiber layers. The stack of fiber layers is removed from the support and an outline shaping process is performed for the stack of fiber layers. The stack of fiber layers is placed in a resin impregnation mold. The stack of fiber layers is impregnated in the mold with resin. The resin is hardened.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 14(a) and 14(b) are diagrams showing energy absorbers according to other modifications of the third embodiment;

FIGS. 15(a) and 15(b) are partial perspective view showing energy absorbers according other modifications of the third embodiment;

FIGS. 16(a) and 16(b) are perspective views showing energy absorbers according other modifications of the third embodiment;

FIG. 17 is a perspective view showing an energy absorber according to another modification of the third embodiment;

FIG. 18 is a perspective view illustrating an energy absorber according to a fourth embodiment of the present invention;

FIG. 19(a) is an end view showing the distal end of the energy absorber shown in FIG. 18;

FIG. 19(b) is an end view showing a cross-section at a middle section of the energy absorber shown in FIG. 18;

FIG. 19(c) is an end view showing the proximal end of the energy absorber shown in FIG. 18;

DETAILED DESCRIPTION OF THE PREFERRED EMBODIMENTS

Figure 2A:
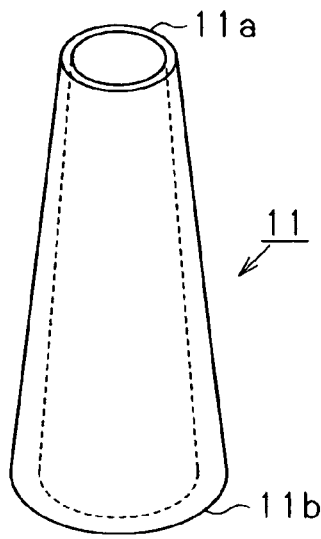
FIG. 2(a) is a perspective view illustrating the energy absorber according to the first embodiment.
Figure 2B:
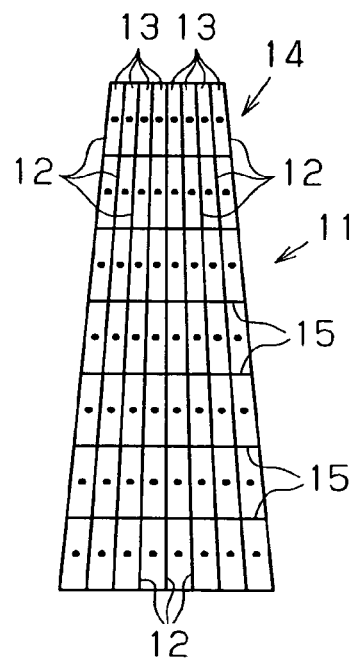
FIG. 2(b) is a longitudinal cross-sectional view of the energy absorber shown in FIG. 2(a)

A first embodiment of the present invention will now be described. As shown in FIG. 2(a), an energy absorber 11 is substantially cylindrical. As shown in FIG. 2(b), the energy absorber 11 is made of fiber-reinforced resin. The thickness of the energy absorber 11 varies from an upper end (distal end 11a) to a lower end (proximal end 11b). In other word, the thickness of the energy absorber 11 varies from a first end (distal end 11a) to a second end (proximal end 11b) of a compression direction of the energy absorber 11. The thickness of the energy absorber 11 is reduced from the proximal end 11b to the distal end 11a. The compression direction of the energy absorber 11 refers to a direction along which the energy absorber 11 receives compressive load when in use. In this embodiment, the energy absorber 11 receives compressive load from the distal end 11a along a vertical direction in FIG. 2(a). The base (proximal end 11b) of the energy absorber 11 is fixed to a predetermined position when in use. The thickness of the energy absorber 11 is reduced from the proximal end 11b to the distal end 11a.

As shown in FIG. 2(b), reinforcing fibers in the fiber-reinforced resin form a stack of fiber layers 14. The stack of fiber layers 14 includes compression direction fiber layers 12 and ninety-degree fiber layers 13. The ninety-degree fiber layers (perpendicular fiber layers) 13 function as intersecting fiber layers. In the compression direction fiber layers 12, bundles of filament fibers are arranged such that the extending direction has a component along the compression direction of the energy absorber 11. "Being arranged to have a compression direction component" means that the fiber bundles arranged parallel to or slantly with respect to the compression direction. That is, the fiber bundles forming the compression direction fiber layers 12 are arranged such that the extending direction has a component along the compression direction of crushing load. The fiber bundles in the ninety-degree fiber layers 13 are arranged perpendicular to the compression direction of the energy absorber 11. Black dots in FIG. 2(b) represent some of the fiber bundles forming the ninety-degree fiber layers 13. In FIG. 2(b), each vertical layer between an adjacent pair of the compression direction fiber layers 12 correspond to one of the ninety-degree fiber layers 13. The compression direction fiber layers 12 and the ninety-degree fiber layers 13 are laminated alternately. Binding threads 15 extend through the stack of fiber layers 14 along the thickness. The binding threads 15 are used to maintain the shape of the stack of fiber layers 14 when the stack of fiber layers 14 is handed in some of the processes for manufacturing the energy absorber 11.

Figure 1:
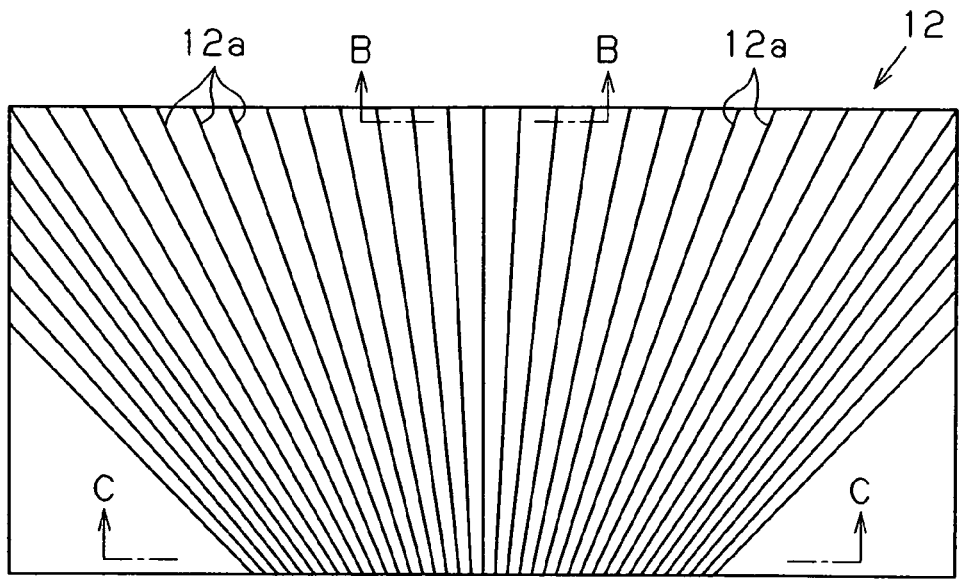
FIG. 1(a) is a partially simplified developed view illustrating the arrangement of fiber bundles in a compression direction fiber layer of an energy absorber according to a first embodiment of the present invention.
FIG. 1(b) is a partially enlarged cross-sectional view along line B-B in FIG. 1(a)
FIG. 1(c) is a partially enlarged cross-sectional view along line C-C in FIG. 1(a)
FIG. 1(d) is a developed view illustrating the arrangement of fiber bundles in a ninety-degree fiber layer of the energy absorber according to the first embodiment.
Figure 1:
Figure 1:
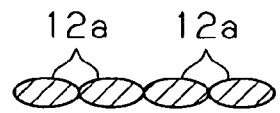
Figure 1:
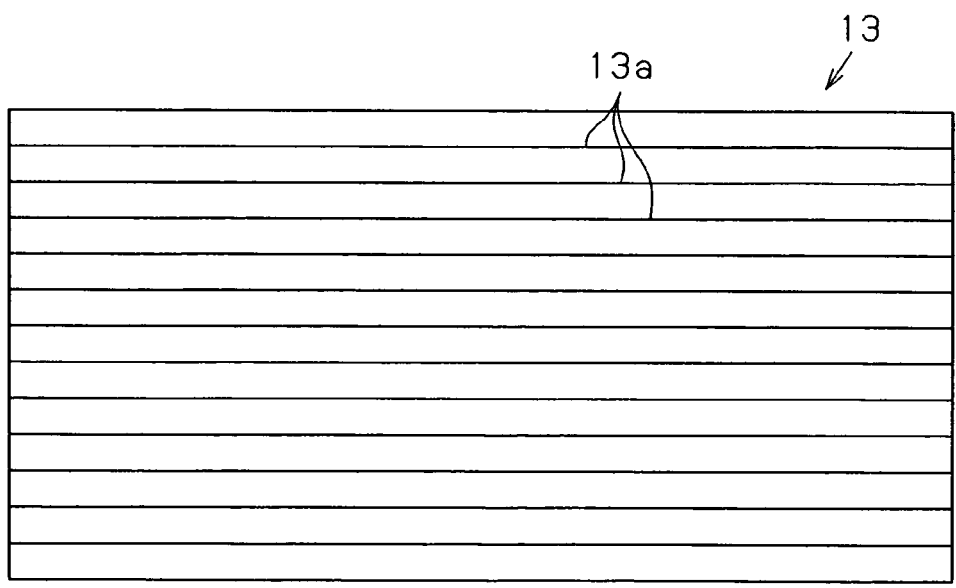

As shown in FIG. 1(a), the density of compression direction fiber bundles 12a, which form the compression direction fiber layers 12, is gradually increased from the distal end 11a to the proximal end 11b of the energy absorber 11. That is, the density of the compression direction fiber bundles 12a is gradually increased from the first end (distal end 11a) to the second end (proximal end 11b) of the compression direction of the energy absorber 11 (the vertical direction as viewed in FIG. 1(a)).

In FIG. 1(a), each adjacent pair of the compression direction fiber bundles 12a are spaced from each other for the purposes of illustration. However, in reality, as shown in FIGS. 1(b) and 1(c), the compression direction fiber bundles 12a are formed flat and contact each other.

In each compression direction fiber layer 12, the distance between the centers of each adjacent compression direction fiber bundles 12a, which extend from the distal end 11a to the proximal end 11b of the energy absorber 11, is narrowed from the distal end 11a to the proximal end 11b. Therefore, most of the compression direction fiber bundles 12a are not parallel to but inclined with respect to the compression direction (vertical direction) of the energy absorber 11.

As shown in FIG. 1(d), ninety-degree fiber bundles 13a, which form the ninety-degree fiber layers 13, are arranged at a constant interval so that the density of the ninety-degree fiber bundles 13a is constant.

Figure 8A:
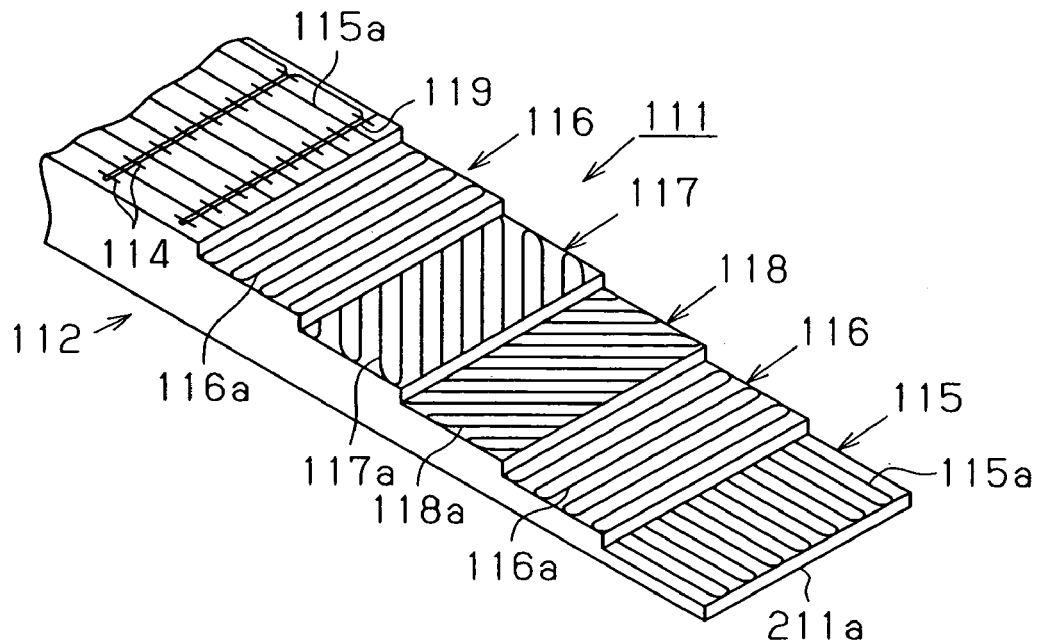
FIG. 8(a) is a perspective view, with a part cut away, illustrating an energy absorber according to a third embodiment of the present invention.
Figure 8B:
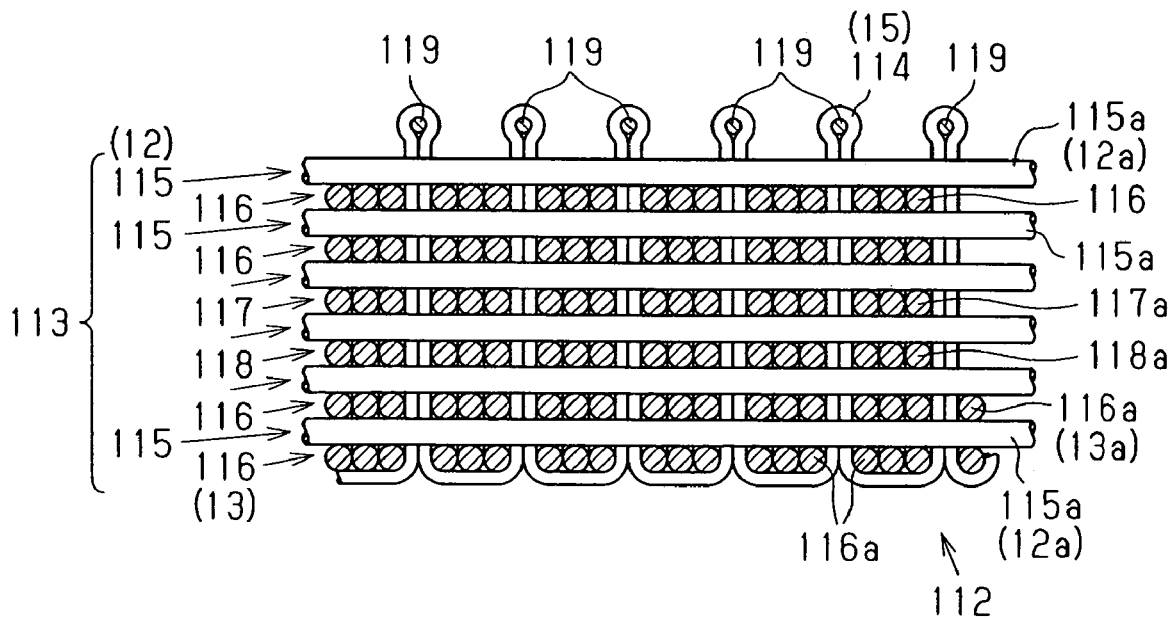
FIG. 8(b) is a cross-sectional view illustrating the energy absorber of FIG. 8(a)

The binding threads 15 are each folded back to form a U-shaped section (see FIG. 8(b)) at a first surface (upper surface in FIG. 8(b)) of the stack of fiber layers 14, and continuously inserted into the stack of fiber layers 14 on a second surface (lower surface in FIG. 8(b)) at an arrangement pitch of the binding threads 15. A retaining thread 119 is passed through the U-shaped section of each binding thread 15. The binding threads 15 and the retaining threads 119 combine the compression direction fiber layers 12 and the ninety-degree fiber layers 13 with each other.

Fiber bundles formed of filament fibers are used as the compression direction fiber bundles 12a, the ninety-degree fiber bundles 13a, and the binding threads 15. In this embodiment, carbon fibers are used as the filament fibers. The number of filaments in each carbon fiber is approximately from 6000 to 48000. A thermosetting resin is used as the matrix resin of the energy absorber 11. In this embodiment, an epoxy resin is used as the matrix resin.

The thickness of the energy absorber 11 is approximately 1.5 to 6.0 mm. The thickness of each of the compression direction fiber layers 12 and the ninety-degree fiber layers 13 is approximately 0.1 to 1.0 mm. The arrangement pitch of the compression direction fiber bundles 12a and the ninety-degree fiber bundles 13a is determined according to a target energy absorption amount.

The method for manufacturing the energy absorber 11 will now be described.

Figure 3:
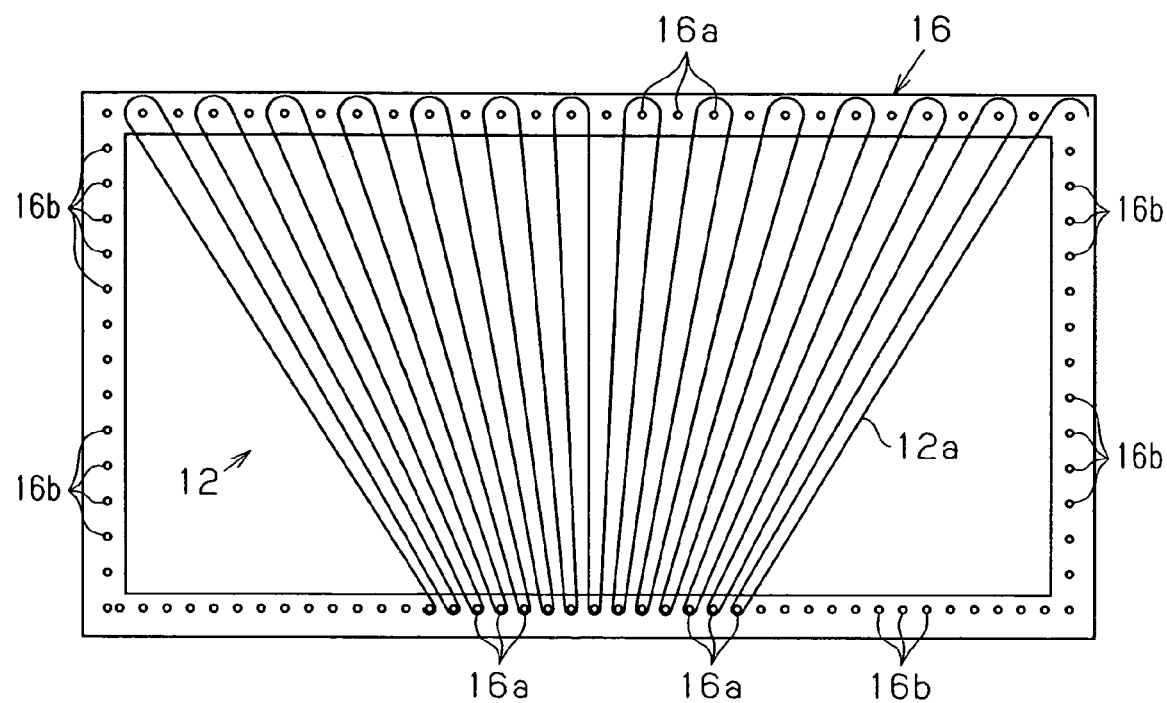
FIG. 3 is a plan view illustrating a frame for forming a compression direction fiber layer of FIG. 1(a) and a ninety-degree fiber layer of FIG. 1(d)

First, using a frame 16, which functions as a support, the stack of fiber layers 14 is formed. As shown in FIG. 3, the frame 16 is rectangular. Supporting members, which are number of detachable pins 16a, 16b, are provided on the frame 16 at a predetermined pitch. The pitch of the pins 16a is determined according to the arrangement pitch of the compression direction fiber bundles 12a. The pitch of the pins 16b is determined according to the arrangement pitch of the ninety-degree fiber bundles 13a.

As shown in FIG. 3, the compression direction fiber bundles 12a are folded back while being engaged with the pins 16a. Accordingly, the compression direction fiber bundles 12a are arranged to have a compression direction component. In this manner, the compression direction fiber layer 12 is formed. Then, the ninety-degree fiber bundles 13a are folded back while being engaged with the pins 16b. In this manner, the ninety-degree fiber bundle 13a is arranged to be perpendicular to the compression direction. In this manner, the ninety-degree fiber layer 13 is formed. Thereafter, the arrangement of the compression direction fiber bundles 12a and the arrangement of the ninety-degree fiber bundles 13a are repeated for a predetermined number of times, thereby forming the stack of fiber layers 14. When arranging the compression direction fiber bundles 12a and the ninety-degree fiber bundles 13a, the fiber bundles are opened. As a result, the compression direction fiber bundles 12a and the ninety-degree fiber bundles 13a are arranged in a flat state.

When arranging the compression direction fiber bundles 12a using the frame 16, not only the pins 16a, but also the pins 16b for arranging the ninety-degree fiber bundles 13a may be used. In this case, the compression direction fiber bundles 12a can be arranged on the frame 16 in a state shown in FIG. 1(b). Therefore, in an outline shaping process, which will be discussed below, the amount of removed portion of the stack of fiber layers 14 is reduced.

"Opening fiber bundles" means to widen the width of the fiber bundles to flatten the fiber bundles. The fiber bundles are opened by pressing the fiber bundles when, for example, arranging the fiber bundles. By adjusting the pressing force, the degree of opening, or the degree of flatness, can be adjusted. The compression direction fiber bundles 12a are arranged in a state where the opening degree is adjusted to less in sections of higher densities.

In FIG. 3, the spaces between the compression direction fiber bundles 12a and the ninety-degree fiber bundles 13a are wide. However, at least the compression direction fiber bundles 12a are arranged such that each adjacent pair contact each other.

Subsequently, a shape maintaining process is performed for the stack of fiber layers 14. Therefore, when the compression direction fiber bundles 12a and the ninety-degree fiber bundles 13a, which have been laminated on the frame 16, are removed from the pins 16a, 16b, the stack of fiber layers 14 is prevented from losing the shape. Accordingly, the stack of fiber layers 14 is readily placed in a mold. In the shape maintaining process according to this embodiment, the binding threads 15, which extend through the stack of fiber layers 14 along the thickness, are inserted into the stack of fiber layers 14.

Insertion of the binding threads 15 is performed by a method disclosed in Japanese Laid-Open Patent Publication No. 8-218249. Specifically, insertion needles (not shown) are inserted in the stack of fiber layers 14 along the thickness. A hole is formed in an distal portion of each insertion needle. The binding threads 15 are caused to pass through the holes. The insertion needles advance until the holes, through which the binding threads 15 pass, pass through the stack of fiber layers 14. Thereafter, the insertion needles are slightly retreated. As a result, the binding threads 15 form U-shaped loops.

Needles for retaining threads 119 are passed through the loops. The retaining thread needles are stopped when reaching an end of the stack of fiber layers 14. At this time, the retaining threads 119 are engaged with the distal ends of the retaining thread needles. Then, the retaining thread needles are pulled back so that the retaining threads 119 are passed through the U-shaped loops of the binding threads 15. In this state, the insertion needles are pulled back so that the retaining threads 119 are fastened by the binding threads 15. As a result, the compression direction fiber layers 12 are bound to the ninety-degree fiber layers 13.

Subsequently, impregnation of resin to the stack of fiber layers 14 and hardening of the resin are performed. The impregnation and hardening of resin are performed by, for example, a resin transfer molding (RTM) method. In the RTM method, the stack of fiber layers 14 is placed in a mold for impregnating resin. Then, a thermosetting matrix resin is injected into the resin impregnation mold to impregnate the stack of fiber layers 14 with the resin. The resin is then heated and hardened to form the energy absorber 11 (the fiber-reinforced resin).

Figure 4:
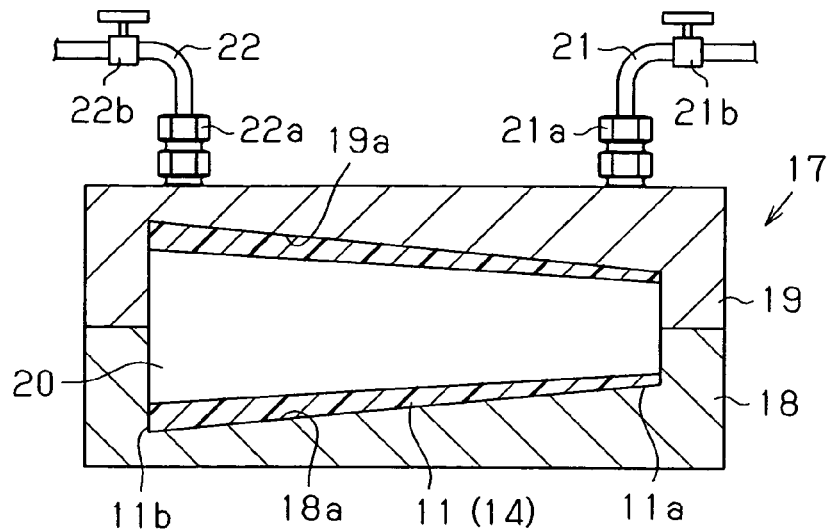
FIG. 4 is a cross-sectional view illustrating a stack of fiber layers of the energy absorber of FIG. 2(a) in a mold, in which the stack of fiber layers is impregnated with resin.

As shown in FIG. 4, the resin impregnation mold 17 includes a lower die 18 and an upper die 19. The lower die 18 and the upper die 19 have mold chambers 18a, 19a, respectively. The mold chambers 18a, 19a form a frustum of a cone, which corresponds to the outer shape of the energy absorber 11. The stack of fiber layers 14 is arranged to cover the circumferential surface of an inner die 20 shaped like a frustum of a cone. That is, the stack of fiber layers 14, together with the inner die 20, is placed in the mold chambers 18a, 19a, and impregnated with the resin. The inner die 20 is shaped such that the thickness of the stack of fiber layers 14 is gradually decreased from the proximal end 11b to the distal end 11a when the stack of fiber layers 14, which is placed between the inner surfaces of the mold chambers 18a, 19a and the circumferential surface of the inner die 20, is impregnated with the resin.

An injection hole and a vent hole (neither is shown) are formed in the upper die 19. The injection hole is coupled to a nipple 21a, which is connected to an injection pipe 21 of the matrix resin. The vent hole is coupled to a nipple 22a, which is connected to a pipe 22 coupled to a decompression device. In a state where a seal ring (not shown) is placed between the lower die 18 and the upper die 19, the upper die 19 is fastened to the lower die 18 with bolts (not shown).

Before placing the stack of fiber layers 14 in the resin impregnation mold 17, the outline shaping process of the stack of fiber layers 14 is performed. The outline shaping process of the stack of fiber layers 14 refers to trimming peripheral portions of the stack of fiber layers 14 such that the size and the opened state of the stack of fiber layers 14 correspond to the shape of the energy absorber 11. That is, the outline shaping process of the stack of fiber layers 14 refers to trimming peripheral portions of the stack of fiber layers 14 to change the size of the stack of fiber layers 14 to be suitable (to a predetermined size) to be placed in the mold 17.

After the outline shaping process, the stack of fiber layers 14 is arranged to cover the circumferential surface of the inner die 20 and accommodated (set) in the mold chamber 18a.

When placing the stack of fiber layers 14 to cover the inner die 20, resin liquid may be applied to the stack of fiber layers 14. After the stack of fiber layers 14 is accommodated in the mold chamber 18a, the upper die 19 is placed over the stack of fiber layers 14, and the lower die 18 and the upper die 19 are fastened to each other by bolts.

Thereafter, as shown in FIG. 4, the injection pipe 21 is connected to the injection hole of the upper die 19, and the pipe 22 is connected to the vent hole. Then, resin is injected. First, a valve 21b in the injection pipe 21 is closed and the interior of the mold chambers 18a, 19a is decompressed. Then, the valve 21b is opened to inject the resin into the resin impregnation mold 17 through the injection hole. After an overflow of the resin from the vent hole is confirmed through a glass decompression trap (not shown) provided in the pipe 22, a valve 22b in the pipe 22 is closed so that the pressure in the resin impregnation mold 17 is increased to a predetermined pressure. Then, the valve 21b of the injection pipe 21 is closed with the pressure in the resin impregnation mold 17 maintained to the predetermined pressure. Then, the resin impregnation mold 17 is heated to harden the matrix resin. When the resin impregnation mold 17 is cooled, the mold 17 is opened and the molded article is removed and fins are removed from the article. The manufacture of the energy absorber 11 is thus completed. The thickness of the energy absorber 11 is gradually reduced from the proximal end 11b to the distal end 11a. The volume content of fibers in the fiber-reinforced resin is substantially constant. The state where the volume content of fibers is "substantially constant" refers to a state where the range of variation of the volume content of fibers is within 5%.

The energy absorber 11 formed in the above manner is used in a state to receive a compressive load from the distal end 11a. When the energy absorber 11 receives a load, the magnitude of which is sufficient to crush the energy absorber 11, the energy absorber 11 is crushed to absorb the energy. As the energy absorber 11 is crushed, not only the resin in the fiber-reinforced resin forming the energy absorber 11, but also the reinforcing fibers are broken so that the load required for crushing the energy absorber 11 is increased. Accordingly, the energy absorption amount of the energy absorber 11 is increased.

Since the density of the compression direction fiber bundles 12a is reduced toward the distal end 11a of the energy absorber 11, the distal portion of the energy absorber 11 is crushed by a small compressive load at an early stage of crushing. As the crushing progresses, portions containing more fiber bundles are crushed, which increases the load required for crushing. Accordingly, the energy absorption amount is increased. That is, an initial load of crushing is small. Since crushing continues successively once started, the compressive load required for crushing is prevented from being abruptly increased. Therefore, crushing of the energy absorber 11 progresses stably to absorb energy.

This embodiment provides the following advantages.

(1) The reinforcing fibers of the fiber-reinforced resin forming the energy absorber 11 include the compression direction fiber layers 12 and the stack of fiber layers 14. In the compression direction fiber layers 12, the compression direction fiber bundles 12a of filament fibers are arranged to have a compression direction component of the energy absorber 11. The ninety-degree fiber layers 13 are arranged perpendicular to the compression direction. The density of the fiber bundles forming the stack of fiber layers 14 is gradually increased from the first end (distal end 11a) to the second end (proximal end 11b) in the compression direction. Therefore, by using the energy absorber 11 such that a section of a higher density of the fiber bundles corresponds to the proximal end 11b, the compressive load required for crushing is prevented from being increased at an early stage of the crushing of the energy absorber 11. Also, the energy absorber 11 stably absorbs energy. Further, the energy absorption amount of the energy absorber 11 is increased.

(2) The density of the compression direction fiber bundles 12a forming the compression direction fiber layers 12 is gradually increased from the first end (distal end 11a) to the second end (proximal end 11b) along the compression direction. Therefore, compared to a case where the density of the stack of fiber layers 14 of the energy absorber 11 is changed by changing the pitch of the ninety-degree fiber bundles 13a, it is easy to change the density of the stack of fiber layers 14 gradually.

(3) The fiber-reinforced resin is formed such that the thickness is changed from the first end (distal end 11a) to the second end (proximal end 11b). Therefore, compared to a case where the amount of fiber bundles is as same as this embodiment and the thickness is constant from the first end (distal end 11a) to the second end (proximal end 11b), the amount of resin in the fiber-reinforced resin is reduced, which reduces the weight of the energy absorber 11.

(4) The fiber-reinforced resin is formed such that the fiber volume content is substantially constant in the stack of fiber layers 14. Therefore, compared to a case where the amount of fiber bundles is as same as this embodiment and the thickness is constant from the distal end 11a to the proximal end 11b (the case where the fiber volume content is varied), the amount of resin in the fiber-reinforced resin is reduced, which reduces the weight of the energy absorber 11.

(5) Since the compression direction fiber bundles 12a are arranged by folding the fiber bundles 12a at the pins 16a fixed to the frame 16, the arrangement is simplified compared to the method disclosed in U.S. Pat. No. 6,406,088, in which fiber bundles of different lengths laminated along the compression direction.

(6) In the manufacturing method of the energy absorber 11, the stack of fiber layers 14 is formed by laminating fiber layers in which fiber bundles are folded back on the frame 16 on which the pins 16a, 16b are arranged at the predetermined pitches. The stack of fiber layers 14 includes the compression direction fiber layers 12, in which the fiber bundles are arranged to have a compression direction component of the energy absorber 11, and the ninety-degree fiber layer 13, in which the fiber bundles are arranged perpendicular to the compression direction. The stack of fiber layers 14 is formed such that the density of the compression direction fiber bundles 12a forming the compression direction fiber layers 12 is gradually increased from the first end (distal end 11a) to the second end (proximal end 11b) in the compression direction. After the stack of fiber layers 14 is formed, the shape maintaining process of the stack of fiber layers 14 is performed. Then, the stack of fiber layers 14 is removed from the frame 16 to be subjected to the outline shaping process. Thereafter, the stack of fiber layers 14 is placed in the resin impregnation mold 17. After the stack of fiber layers 14 is impregnated with resin, the resin is hardened.

Therefore, the outer shape of the energy absorber 11 is determined by the shape of the cavity (the mold chambers 18a, 19a) of the resin impregnation mold 17, and the inner shape of the energy absorber 11 is determined by the shapes of the cavity and the inner die 20. As a result, the substantially cylindrical energy absorber 11 is easily formed which has a diameter that is gradually changed (reduced) from the proximal end 11b to the distal end 11a and a constant thickness.

(7) In the shape maintaining process, the binding threads 15 are inserted to pass through the stack of fiber layers 14 along the thickness. Thus, when the energy absorber 11 receives a compressive load and is crushed, the binding threads 15 prevent exfoliation between layers in the compression direction fiber layers 12 and the ninety-degree fiber layers 13. The energy required for crushing is increased, accordingly. As a result, compared to a case where parts of the compression direction fiber layers 12 and the ninety-degree fiber layers 13 are temporarily fixed with, for example, adhesive, the energy absorption amount is increased.

(8) Although the compression direction fiber bundles 12a are arranged such that the density varies along the compression direction, an adjacent pair of the compression direction fiber bundles 12a are not separated by resin. However, the compression direction fiber bundles 12a are arranged to contact one another. Therefore, compared to a case where each adjacent pair of the compression direction fiber bundles 12a are separated by resin, the energy required for crushing is increased. Accordingly, the energy absorption amount is increased.

Figure 5A:
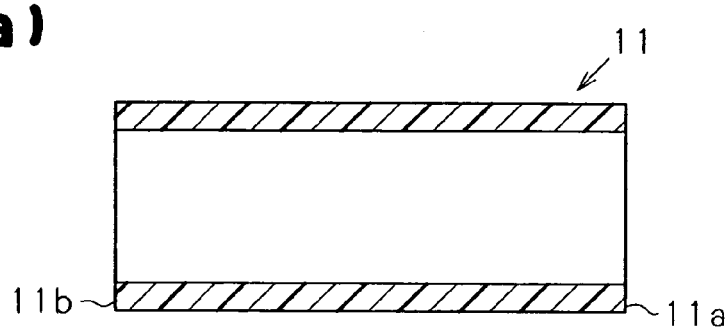
FIG. 5(a) is a cross-sectional view illustrating an energy absorber according to a second embodiment of the present invention.
Figure 5B:
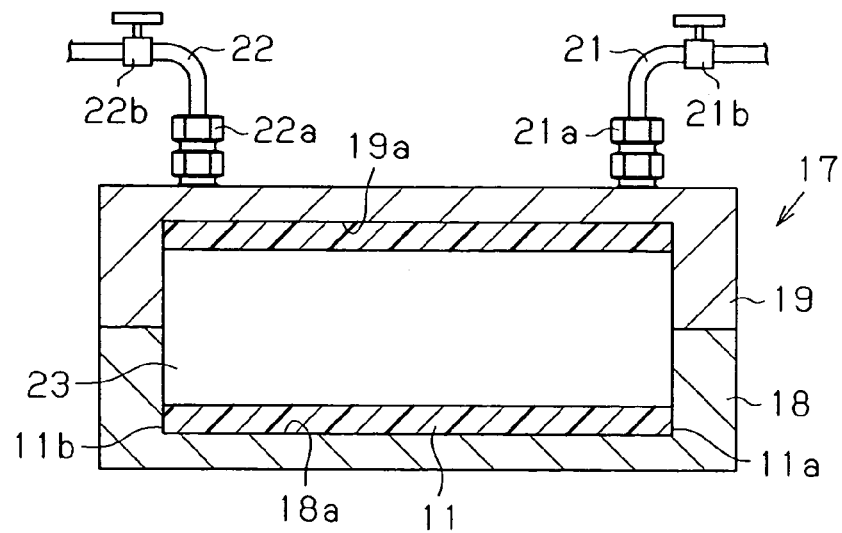
FIG. 5(b) is a cross-sectional view illustrating a stack of fiber layers of the energy absorber of FIG. 5(a) in a mold, in which the stack of fiber layers are impregnated with resin.

A second embodiment of the present invention will now be described with reference to FIGS. 5(a) and 5(b). The second embodiment is different from the first embodiment in that the energy absorber 11 is formed cylindrical, and has a constant thickness and a constant outer diameter. The other configurations are the same as those of the first embodiment. Like or the same reference numerals are given to those components that are like or the same as the corresponding components of the first embodiment, and the explanations thereof are omitted.

The manufacturing method of the energy absorber 11 of the second embodiment is the same as that of the first embodiment up to the point where the stack of fiber layers 14 is formed on the frame 16, the binding threads 15 are inserted into the stack of fiber layers 14, and the shape maintaining process is performed. The resin impregnation mold 17 for impregnating resin to the stack of fiber layers 14 and hardening the resin is formed such that the mold chambers 18a, 19a define a cylinder having a constant diameter. A cylindrical inner die 23 having a constant diameter is used. Thereafter, the stack of fiber layers 14 is removed from the frame 16 and subjected to the outline shaping process. Thereafter, the stack of fiber layers 14 is placed in the resin impregnation mold 17. After the stack of fiber layers 14 is impregnated with resin, the resin is hardened. Since the fiber-reinforced resin forming the energy absorber 11 has a substantially constant thickness from the first end (distal end 11a) to the second end (proximal end 11b), the fiber volume content is varied (increased) from the first end (distal end 11a) to the second end (proximal end 11b) along the compression direction of the energy absorber 11.

As in the first embodiment, the energy absorber 11 of the second embodiment is used such that a section of a greater density is located at the proximal end 11b. In addition to the same advantages as the advantages (1), (2), (5) to (8) of the first embodiment, the second embodiment has the following advantages.

(9) The thickness of the fiber-reinforced resin is substantially constant. Therefore, when manufacturing the energy absorber 11, a process for impregnating the stack of fiber layers 14, which contains the reinforcing fibers of the fiber-reinforced resin forming the energy absorber 11, with resin is simplified compared to that of the energy absorber 11 that has a fiber-reinforced resin of a varied thickness.

The above-described embodiments may be embodied in the following forms.

In the illustrated embodiments, the energy absorber 11 is formed of fiber-reinforced resin containing reinforcing fibers. The reinforcing fibers form a stack of fiber layers that has compression direction fiber layers arranged such that fiber bundles made of filament fibers have a compression direction component of the energy absorber 11. Also, the density of the fiber bundles forming the compression direction fiber layers is gradually increased from the first end (distal end 11a) to the second end (proximal end 11b). As long as these features are maintained, the configuration may be changed. For example, unlike the first and second embodiments, the stack of fiber layers 14 may be formed only of the compression direction fiber bundles 12a. In this case, the density of the compression direction fiber bundles 12a needs to be gradually increased from the first end (distal end 11a) to the second end (proximal end 11b) in the compression direction of the energy absorber 11. Specifically, the stack of fiber layers 14 may be formed by laminating compression direction fiber layers 12 having different densities.

Alternatively, the stack of fiber layers 14 may be formed of compression direction fiber layers 12 of different types. That is, the stack of fiber layers 14 may have compression direction fiber layers 12, in each of which the density of the compression direction fiber bundles 12a is gradually increased from the first end (distal end 11a) to the second end (proximal end 11b) along the compression direction of the energy absorber 11, and compression direction fiber layers 12, in each of which the density of the compression direction fiber bundles 12a is constant.

In the stack of fiber layers 14, in which the compression direction fiber layers 12 and the ninety-degree fiber layers 13 are laminated, some of the compression direction fiber layers 12 may have compression direction fiber bundles 12a of a constant density.

In the stack of fiber layers 14, in which the compression direction fiber layers 12 and the ninety-degree fiber layers 13 are laminated, the density of the compression direction fiber bundles 12a does not need to be the same for all the compression direction fiber layers 12. However, a stack of fiber layers 14 in which compression direction fiber layers 12 of different densities may be used as reinforcing fibers.

The arrangement direction of the ninety-degree fiber bundles 13a forming the ninety-degree fiber layers 13 does not need to be perpendicular to the compression direction of the energy absorber 11, but may be changed as long as the direction intersects the compression direction. The intersecting angle is preferably between forty-five to ninety-degrees with respect to the compression direction.

Figure 6A:
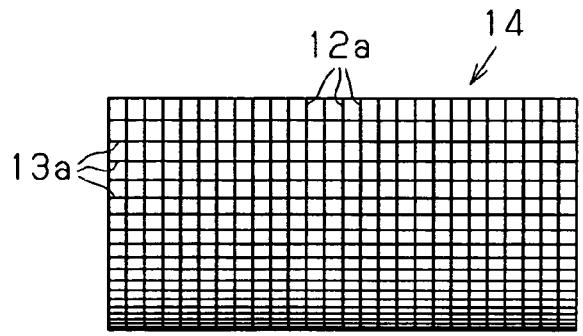
FIGS. 6(a) and 6(b) are diagrams showing different arrangements of fiber bundles of the compression direction fiber layers and ninety-degree fiber layers.

In a case where the stack of fiber layers 14 has the compression direction fiber layers 12 and the ninety-degree fiber layers 13, the configuration may be changed as long as at least one of the density of the compression direction fiber bundles 12a forming the stack of fiber layers 14 and the density of the ninety-degree fiber bundles 13a forming the stack of fiber layers 14 is gradually increased from the first end (distal end 11a) to the second end (proximal end 11b) of the compression direction of the energy absorber 11. For example, as shown in FIG. 6(a), the density of the compression direction fiber bundles 12a may be constant, and the density of the ninety-degree fiber bundles 13a may be gradually increased from the first end (distal end 11a) to the second end (proximal end 11b) of the compression direction of the energy absorber 11. In this case, since the density of the ninety-degree fiber bundles 13a is increased at the proximal end 11b of the energy absorber 11, the amount of the ninety-degree fiber bundles 13a that are broken during crushing of the energy absorber 11 is increased. This increases the load required for crushing, and thus permits the energy absorber 11 to effectively absorb energy.

Figure 6B:
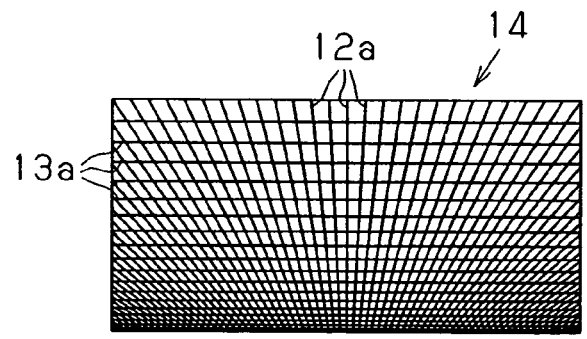

As shown in FIG. 6(b), the densities of the compression direction fiber bundles 12a and the ninety-degree fiber bundles 13a may be both changed from the first end (distal end 11a) to the second end (proximal end 11b). In this case, the energy absorption amount of the energy absorber 11 may be increased more than any of the above described embodiments.

Figure 7A:
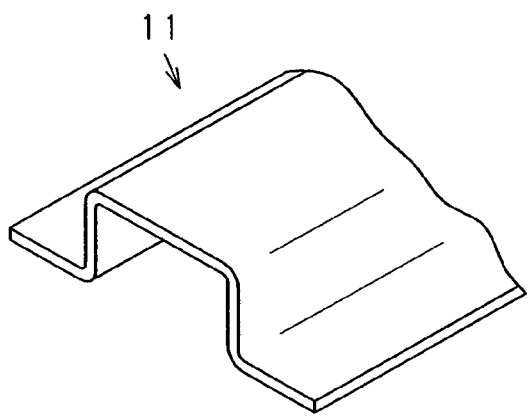
FIGS. 7(a), 7(b), and 7(c) are perspective views illustrating energy absorbers according to modifications of the above-mentioned embodiments.
Figure 7C:
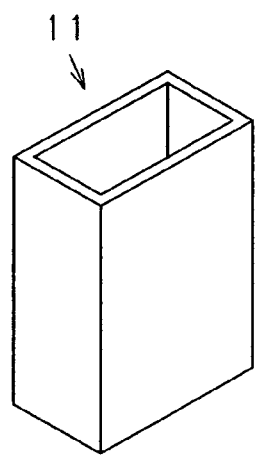
Figure 7B:
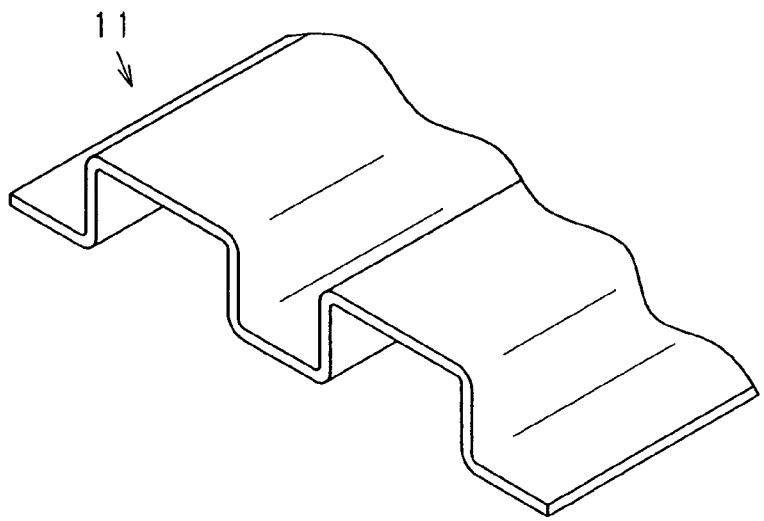

The shape of the energy absorber 11 does not need to be cylindrical. For example, as shown in FIG. 7(a), the energy absorber 11 may have a hat-shaped cross-section, a shape of coupled hats as shown in FIG. 7(b), or a rectangular tube as shown in FIG. 7(c). The energy absorber 11 may have a wavy cross-section. Whatever cross-sectional shape the energy absorber 11 has, the energy absorber 11 is manufactured in a method shown in the first and second embodiments. That is, after forming the stack of fiber layers 14 using the frame 16, the resin impregnation mold 17 having the mold chambers 18a, 19a corresponding to the shape of the energy absorber 11 are used. When manufacturing the energy absorber 11 having a polygonal cross-section, a polygonal prism shaped inner die is used.

The tubular energy absorber 11 in which the density of the ninety-degree fiber bundles 13a changes may be formed by the filament winding method. For example, a mandrel is prepared with pins at both ends, which pins are used for folding the compression direction fiber bundles 12a. Fiber bundles to which resin has been applied are engaged with the pins to arrange the fiber bundles along the axis of the mandrel. This step is referred to as arrangement step. The arrangement step and hoop winding are performed alternately. At the hoop winding, the fiber bundles are arranged such that the pitch gradually increases from the second end (proximal end 11b) to the first end (distal end 11a).

In the shape maintaining process performed after the formation of the stack of fiber layers 14 during the manufacture of the energy absorber 11, the compression direction fiber bundles 12a and the ninety-degree fiber bundles 13a may be temporarily fixed at several positions with adhesive or a thermoplastic resin, instead of inserting the binding threads 15 into the stack of fiber layers 14. A rubber-resin adhesive, which has rubber-based material and resin as tackifier, may be used. When using an adhesive to temporarily fixing the fiber bundles 12a, 13a without using the binding threads 15 in the shape maintaining process of the stack of fiber layers 14, the frame 16 does not need to be used as a support for arranging the compression direction fiber bundles 12a and the ninety-degree fiber bundles 13a. Instead, a plate having the pins 16a, 16b provided at the peripheral portion may be used.

Fiber bundles having varied sizes may be used for forming the compression direction fiber bundles 12a and the ninety-degree fiber bundles 13a.

The fiber bundles used as the compression direction fiber bundles 12a, the ninety-degree fiber bundles 13a, the binding threads 15, and the retaining threads 119 do not need to be carbon fibers. For example, glass fibers or polyaramide fibers may be used according to required properties and usage of the energy absorber 11.

The thermosetting resin forming the energy absorber 11 does not need to be an epoxy resin, but may be a phenol resin or an unsaturated polyester resin.

As the matrix resin forming the energy absorber 11, a thermoplastic resin may be used instead of the thermosetting resin. In a case where a thermoplastic resin is used as the matrix resin, the stack of fiber layers 14 is impregnated with thermoplastic resin by a conventional impregnating method such as melting impregnation molding. The resin is then cooled to form the energy absorber 11. As a thermoplastic resin, for example, nylon, polybutylene terephthalate, or polycarbonate may be used.

When a thermoplastic resin is used as the matrix resin of the energy absorber 11, the fiber bundles may be entirely impregnated with the thermoplastic resin. In this case, after arranging the compression direction fiber bundles 12a and the ninety-degree fiber bundles 13a, the fiber bundles 12a, 13a are integrated to form a plate member. The plate member is set in a mold, and is then heated and softened to form the energy absorber 11 having a predetermined shape.

A third embodiment of the present invention will now be described. As shown in FIG. 8(a), an energy absorber 111 is made of a fiber-reinforced resin having a fiber structure 112 as a reinforcing member. As shown in FIG. 8(b), the fiber structure 112 is formed as a plate and includes a stack of fiber layers 113 and binding threads 114. The stack of fiber layers 113 is arranged such that fiber bundles made of filament fibers have at least two axes, or a biaxial structure (in this embodiment, four axes, or a quadraxial structure). The binding threads 114 extend through the stack of fiber layers 113 along the thickness.

As shown in FIG. 8(a), the stack of fiber layers 113 includes an x thread layers 115 each formed of x threads 115a, a y thread layers 116 each formed of y threads 116a, and a bias thread layers 117, 118 each formed of bias threads 117a, 118a. The x threads 115a are arranged to extend along a direction in which compressive load is applied when the energy absorber 111 is used. The y threads 116a are arranged perpendicular to the x threads 115a. The bias threads 117a, 118a are arranged to be diagonal to the x threads 115a and the y threads 116a (in this embodiment, to form an angle of forty-five degrees). The stack of fiber layers 113 is preferably configured such that the layers are symmetric with respect to a center plane along the thickness. In FIG. 8(b), the cross-sections of the bias threads 117a, 118a should be an ellipse. However, for purposes of illustration, the cross-sections are circular in the drawings.

As shown in FIGS. 8(a) and 8(b), the binding threads 114 are each folded back to form a U-shaped section at a first surface (upper surface as viewed in FIGS. 8(a) and 8(b)) of the stack of fiber layers 113, and continuously inserted into the stack of fiber layers 113 on a second surface (lower surface as viewed in FIGS. 8(a) and 8(b)) at an arrangement pitch of the binding threads 114. The retaining threads 119 are passed through at U-shaped sections of the binding threads 114. The binding threads 114 and the retaining threads 119 combine the x thread layers 115, the y threads layers 116, and the bias thread layers 117, 118.

The binding threads 114, the x threads 115a, the y threads 116a, the bias threads 117a, 118a, and the retaining threads 119 are made of fiber bundles of filament fibers. In this embodiment, carbon fibers are used as the filament fibers. The number of filaments in the carbon fiber is approximately from 6000 to 48000. A thermosetting resin is used as the matrix resin of the energy absorber 111. In this embodiment, an epoxy resin is used as the matrix resin.

The thickness of the fiber structure 112 is about 1.5 to 6 mm, and the thickness of a single layer is about 0.1 to 1 mm. The arrangement pitch and the insertion density of the binding threads 114 is determined according to a desired energy absorption amount. The insertion density of the binding threads 114 is preferably no less than 28000 threads/m$^2$, and more preferably no less than 56000 threads/m$^2$. An excessively high density makes the insertion difficult. Also, since the energy absorption amount is not increased at a rate equivalent to a rate of increase of the insertion density, the insertion density can be increased only up to 250000 threads/m$^2$. The ratio of the binding threads 114 to the entire weight of the energy absorber 111 is no more than several percent.

The method for manufacturing the fiber structure 112 will now be described.

Figure 9A:
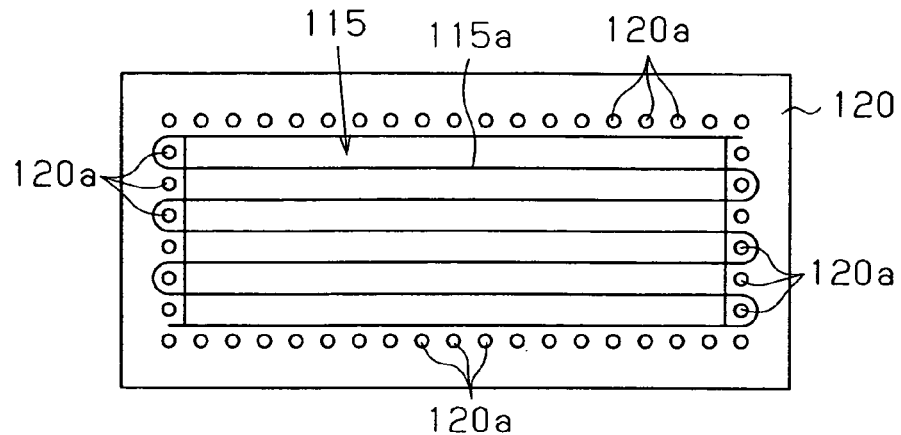
FIGS. 9(a) and 9(b) are plan views illustrating arrangement of fiber bundles of the energy absorber shown in FIG. 8(a)
Figure 9B:
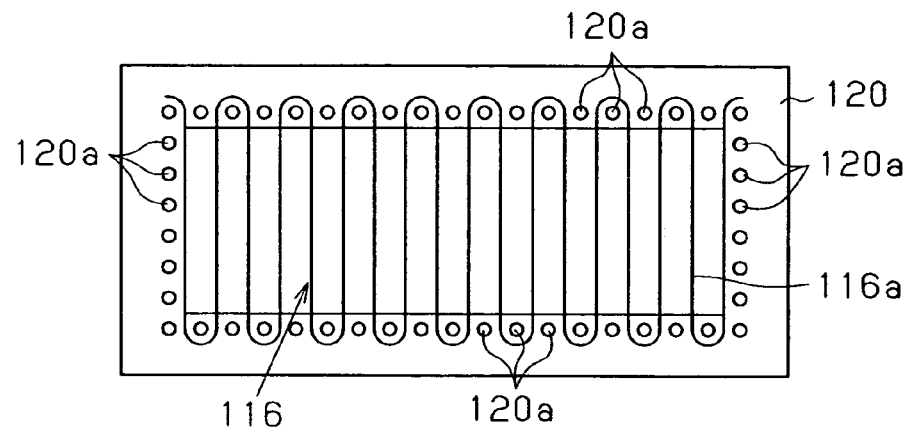

As shown in FIGS. 9(*a*) and 9(*b*), a rectangular frame 120 with a number of standing pins 120*a* is prepared. The pins 120*a* are detachably attached to the frame 120. First, the stack of fiber layers 113 is formed using the frame 120. The pitch of the pins 120*a* is determined according to the x threads 115*a* and the y threads 116*a*.

As shown in FIG. 9(*a*), the x threads 115*a* are folded back while being engaged with the pins 120*a*, so that an x thread layer 115 arranged in a single direction is formed. As shown in FIG. 9(*b*), the y threads 116*a* are folded back while being engaged with the pins 120*a*, so that an y thread layer 116 arranged in a single direction perpendicular to the x threads 115*a* is formed. The bias threads 117*a*, 118*a* are arranged to be diagonal to the x threads 115*a* and the y threads 116*a* (in this embodiment, to form an angle of forty-five degrees), so that bias thread layers 117, 118 are formed. The formation of these layers is repeated for a predetermined number of times for forming the stack of fiber layers 113. In FIGS. 9(*a*) and 9(*b*), the spaces between the x threads 115*a* and the y threads 116*a* are wide. However, in reality, each adjacent pair of the x threads 115*a* and the y threads 116*a* contact each other when arranged. Therefore, as shown in FIG. 8(*b*), in sections where the binding threads 114 are not provided, each adjacent pair of the x threads 115*a* and the y threads 116*a* contact each other.

Next, the binding threads 114 are inserted into the stack of fiber layers 113, for example, by a method disclosed in Japanese Laid-Open Patent Publication No. 8-218249. Specifically, using the above described insertion needles, U-shaped loops are formed with the binding threads 114.

Retaining thread needles (not shown) are passed through the loops. The retaining thread needles are stopped when reaching an end of the stack of fiber layers 113. At this time, the retaining threads 119 are engaged with the distal ends of retaining thread needles. Then, the retaining threads 119 are then pulled back to be passed through the U-shaped loops of the binding threads 114. In this state, the insertion needles are pulled back so that the retaining threads 119 are fastened by the binding threads 114. Accordingly, the fiber structure 112 with the layers bound together is formed.

After impregnating the fiber structure 112 with a matrix resin, the matrix resin is hardened to obtain the energy absorber 111.

Figure 10:
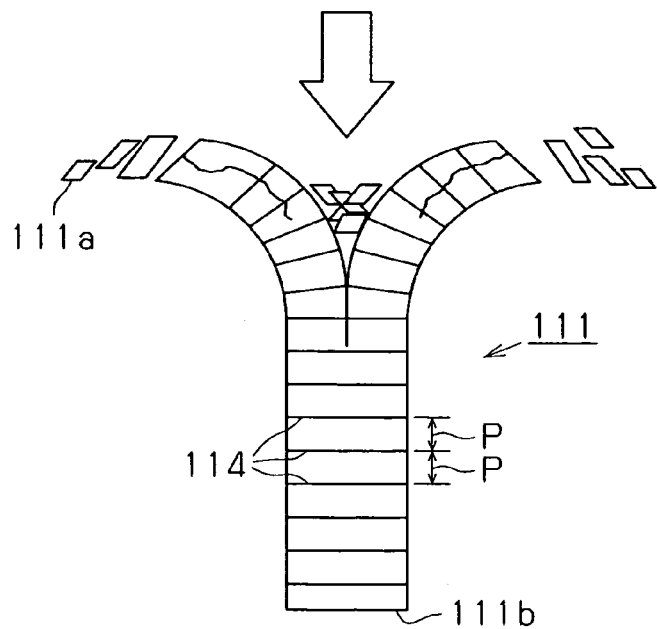
FIG. 10 is a diagram showing a crushed state of the energy absorber shown in FIG. 8(a)

The energy absorber 111 is used in a state where compressive load is applied to the energy absorber 111 along the arrangement direction of the x threads 115*a*. As shown in FIG. 10, when compressive load is applied to the energy absorber 111, crushing occurs such that the energy absorber 111 is split at the interface between layers substantially at the center of the energy absorber 111 along the thickness. The energy absorber 111 absorbs energy of the compression by breaking itself. The product of load required for crushing and the amount of displacement corresponds to the energy absorption amount.

If a crack is created between layers at about the center along the thickness of the energy absorber 111 in a case where the binding threads 114 are not provided, the reinforcing fibers do not function to suppress interlayer crack along an arrangement plane of the fiber bundles. As a result, interlayer cracks are likely to develop. Therefore, when the energy absorber 111 is compressed and absorbs energy by breaking itself, the property of resin between layers affects the energy absorption, which hampers the energy absorber 111 from exerting the advantages of reinforcing fibers.

However, in this embodiment, since the binding threads 114 are provided to extend through the thickness of the stack of fiber layers 113, when compressive load is applied to the energy absorber 111, an interlayer crack at about the center along the thickness is created with the load exceeding a value that cuts the binding threads 114. Therefore, compared to a case where the binding threads 114 are not provided, a higher energy is required for crushing the energy absorber 111. The energy absorber 111 also has an advantage that because of the binding threads 114, a crack hardly progresses.

Figure 11:
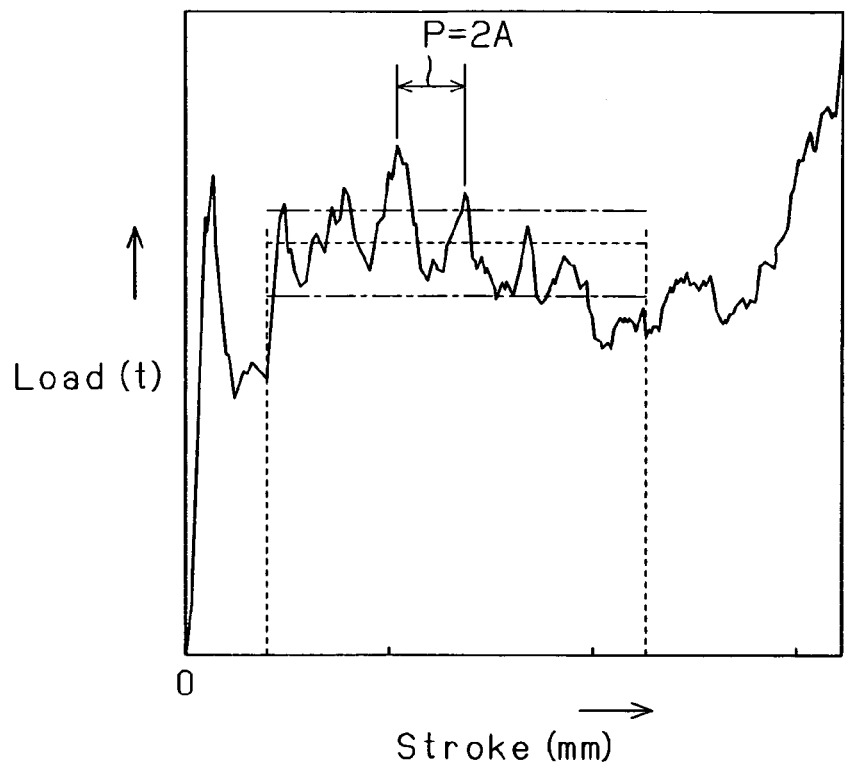
FIGS. 11(a) and 11(b) are graphs showing the influence of the insertion pitch of binding threads along a compression direction to the crushing load of the energy absorber shown in FIG. 8(a)
Figure 11:
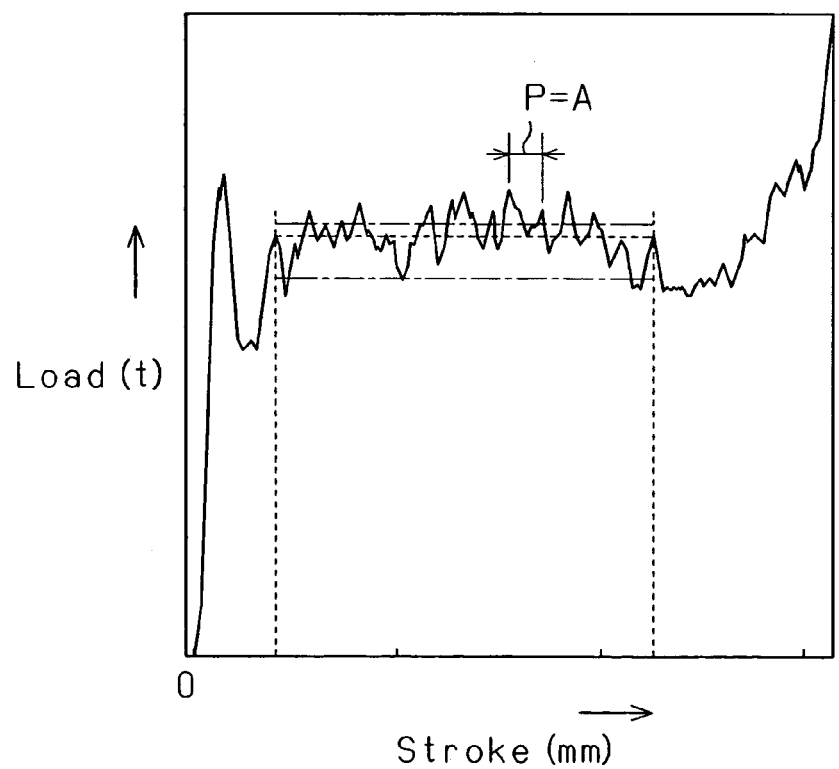

FIGS. 11(*a*) and 11(*b*) show the result of experiments in which the insertion pitch P of the binding threads 114 was changed relative to the direction of crushing (load direction) of the energy absorber 111. The vertical axes represent load, and the horizontal axes represent the amount of displacement (stroke) of a pressing body that applied compressive load to the energy absorber 111. In these graphs, the horizontal axes correspond to displacement of the energy absorber 111. FIG. 11(*a*) shows an example where the insertion density of the binding threads 114 was as same as that of the case of FIG. 11(*b*), and the insertion pitch P was twice that of the case of FIG. 11(*b*). That is, when the insertion pitch P of the binding threads 114 in the energy absorber 111 of FIG. 11(*b*) is represented by A, the insertion pitch P of the binding threads 114 in the energy absorber 111 of FIG. 11(*a*) is represented by 2A. As obvious from FIGS. 11(*a*) and 11(*b*), compressive load was maximized at a part where the binding threads 114 existed. The smaller the insertion pitch P of the binding threads 114 relative to the compression direction, the narrower the fluctuation range of the load becomes. This is believed to demonstrate that crushing of the energy absorber 111 progresses with repetition of breakage of the binding threads 114 and cracking of resin between the binding threads 114. Therefore, to stabilize load applied to the energy absorber 111, reduction of the insertion pitch P of the binding threads 114 along the compression direction is effective.

Further, when the energy absorber 111 is crushed to be split into two between layers at about the center along the thickness, the split pieces each have the binding threads 114. The binding threads 114 suppress shearing and bending. Energy is thus needed to further develop the crushing in the split two pieces (into shards). The energy absorption amount was measured while changing the insertion density of the binding threads 114.

Figure 12:
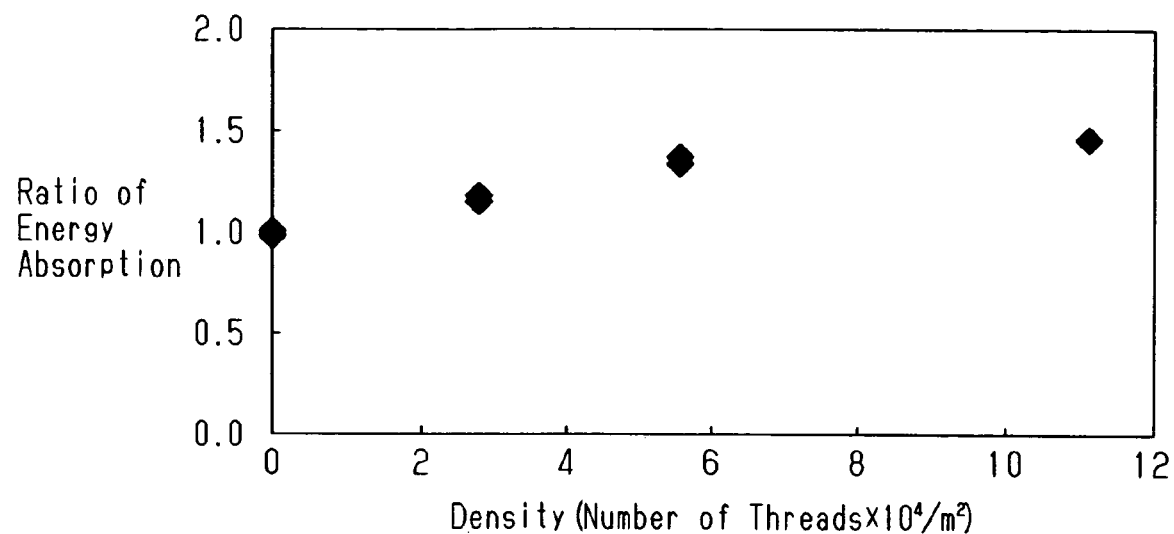
FIG. 12 is a graph showing the relationship between the energy absorption rate of the energy absorber shown in FIG. 8(a) and the insertion density of the binding threads.

When the insertion density of the binding threads 114 was 28000 threads/m$^2$, the absorbed energy amount was increased by 15 to 18% as compared to a case where the binding threads 114 are not provided. When the insertion density of the binding threads 114 was 56000 threads/m$^2$, the absorbed energy amount was increased by 34 to 38%. When the insertion density of the binding threads 114 was 112000 threads/m$^2$, the absorbed energy amount was increased by 47%. The results are shown in the graph of FIG. 12. In FIG. 12, the vertical axis represents a ratio (ratio of energy absorption) when the energy absorption amount in a case where the binding threads 114 are not provided as one. The horizontal axis represents the insertion density of the binding threads 114 (number of threads/m$^2$). FIG. 12 shows that the higher the insertion density of the binding threads 114, the higher the energy absorbed amount becomes.

This embodiment provides the following advantages.

(11) The energy absorber 111 is made of a fiber-reinforced resin having the fiber structure 112 as a reinforcing member.

The fiber structure 112 includes the stack of fiber layers 113 and the binding threads 114. The stack of fiber layers 113 is arranged such that fiber bundles made of filament fibers have at least two axes, or a biaxial structure. The binding threads 114 extend through the stack of fiber layers 113 along the thickness. Therefore, compared to a case where the binding threads 114 are not provided, a higher energy is required for crushing the energy absorber 111. Thus, compared to a case of a conventional energy absorber having no binding threads, the energy absorber 111 has a higher energy absorption power.

(12) The ratio of the binding threads 114 to the entire weight of the energy absorber 111 is no more than several percent. Therefore, the energy absorption amount is increased by a greater degree than the rate of a weight increase, while hardly increasing the weight.

(13) The binding threads 114 are arranged to be perpendicular to the fiber arrangement plane of the stack of fiber layers 113. That is, the binding threads 114 are perpendicular to a plane parallel to the fiber bundles having a biaxial structure. Therefore, compared to a case where the binding threads 114 slantly intersect the fiber arrangement plane of the stack of fiber layers 113, the energy absorber 111 has a higher energy absorption power.

(14) The insertion density of the binding threads 114 to the stack of fiber layers 113 is no less than 28000 threads/$m^2$. Therefore, compared to a case where the binding threads 114 are not provided, the energy absorption amount is increased by no less than 15%.

(15) The stack of fiber layers 113 of the energy absorber 111 has quadraxial structure. Therefore, compared to a biaxial structure, the energy absorption amount when the energy absorber 111 receives compressive load in a slanted direction is increased.

(16) Carbon fibers are used for the stack of fiber layers 113 and the binding threads 114. Compared to a case where glass fibers or resin fibers are used, the energy absorption amount of the energy absorber 111 is increased.

The above-described embodiments may be embodied in the following forms.

Figure 13A:
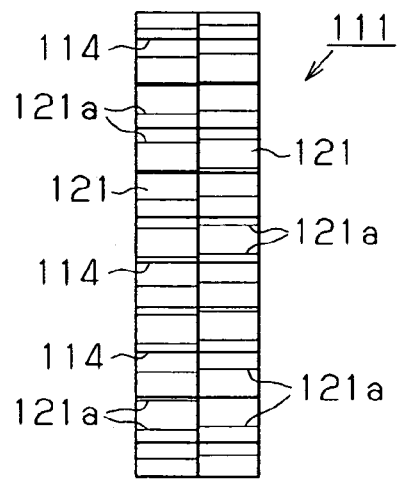
FIG. 13(a) is a diagram showing an energy absorber according to a modification of the third embodiment.
Figure 13B:
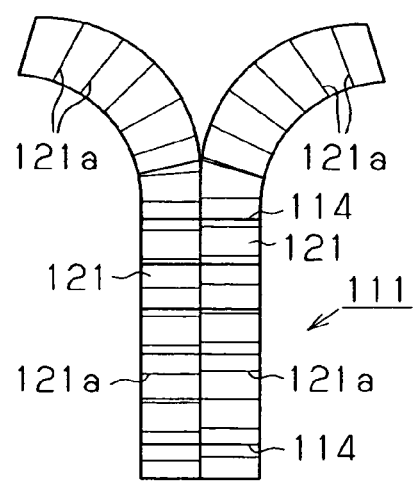
FIG. 13(b) is a diagram showing a crushed state of the energy absorber shown in FIG. 13(a)

As shown in FIG. 13(a), the energy absorber 111 may be formed of a fiber-reinforced resin that has a fiber structure 112. The fiber structure 112 is formed by binding two three-dimensional fabric sheets (three-dimensional fiber structures) 121 with the binding threads 114. When the energy absorber 111 receives compressive load, the energy absorber 111 is crushed while being split into two pieces at the interface between the three-dimensional fabric sheets 121 as shown in FIG. 13(b). In the previous embodiment, in which the stack of fiber layers 113 is combined with the binding threads 114, the only split sections of the binding threads 114 (fibers) remain in the broken sections after the binding threads 114 are broken. This lowers the suppressing performance of the split sections against shearing and bending. However, in this embodiment, the three-dimensional fabric sheets 121 are combined with the binding threads 114. Even if the binding threads 114 are broken, thickness threads 121a extend along the thickness to bind the layers in the stack of fiber layers 113 in the three-dimensional fabric sheets 121. Therefore, shearing and bending are effectively suppressed, and the energy absorption amount is further increased.

If the energy absorber 111 is formed of a fiber-reinforced resin that has a fiber structure 112 formed by binding two three-dimensional fabric sheets (three-dimensional fiber structures) 121 with the binding threads 114, the two three-dimensional fabric sheets 121 do not need to be shaped as plates, but may have a closed structure. For example, as shown in FIG. 14(a), the three-dimensional fabric sheets 121 may have a closed and flat structure and combined with the binding threads 114 extending therethrough. Alternatively, the three-dimensional fabric sheets 121 may have a closed and flat structure and combined by connecting the adjacent parts with the binding threads 114 as shown in FIG. 14(b). In the case of FIG. 14(b), after combining the two plate-like three-dimensional fabric sheets 121 with the binding threads 114, the plate-like portions may be bent and the ends may be connected to each other to form a closed structure. A plate-like fabric and a fabric of a closed structure may be combined with the binding threads 114. The closed structure refers to a tubular shape such as a hollow cylinder, a polygonal tube, and any tubular structure with ribs on the circumferential surface.

The number of the three-dimensional fabric sheets (three-dimensional fiber structures) 121 is not limited to two. The reinforcing fibers may be formed of the fiber structure 112 having three or more three-dimensional fabric sheets 121 combined together with the binding threads 114.

The shape of the energy absorber 111 is not limited to a flat plate, but may have a wavy or an S-shaped cross-section. Compared to a case where the energy absorber 111 is shaped as a flat plate, if the energy absorber 111 has a wavy cross-section or an S-shaped cross-section, buckling is less likely to occur. The energy absorber 111 having a wavy or S-shaped cross-section can be manufactured by using a mold having a wavy or S-shaped when impregnating the plate-like fiber structure 112 with resin. In this case, although the thickness of the fiber structure 112 varies depending on the volume contents of the fiber bundles, a thickness no more than 3 mm permits the fiber structure 112 to be easily deformed to conform to the shape of the cavity of the mold.

The energy absorber 111 may have a closed structure. For example, the energy absorber 111 may be shaped as a hollow cylinder or a polygonal tube. Specifically, the energy absorber 111 may have shapes shown in FIGS. 15(a) and 15(b). In the case of FIG. 15(a), the energy absorber 111 includes a fiber structure 112 that has a hat shaped channel-like cross-section and a flat plate-like fiber structure 112 combined together. In the case of FIG. 15(b), the energy absorber 111 has two identical fiber structures 112 having a portion of a semicircular cross-section and flat ribs combined together. In the case of these energy absorbers 111 having a closed structure, when the energy absorber 111 is crushed by compressive load, interlayer breakage of fiber bundles occurs in the center along the thickness. Compared to the energy absorbers 111 having a wavy and S-shaped cross-sections, buckling is less likely to occur.

When forming the energy absorber 111 to have a cylindrical or polygonal tubular shape, a flat plate-like fiber structure 112 may be bent as shown in FIGS. 16(a) and 16(b) so that the ends are overlaid on each other. In this case, the overlaid sections may be coupled to each other by sewing with a sewing machine or by using the binding threads 114 and the retaining threads 119. In such a case, the thickness of the overlaid sections may be reduced.

When the ends of the flat plate-like fiber structure 112 is overlaid on each other and connected to each other, the overlaying area may be increased in the direction of compressive load as shown in FIG. 17. Instead of changing the overlaying area of the overlaid sections, the coupling density (the insertion density of the binding threads 114) may be changed.

The area of the inner space of a closed structure may be changed along the direction of compressive load. For example, the shape of the energy absorber 111 may be shaped like a hollow truncated pyramid or a hollow truncated cone.

The higher the insertion density of the binding threads 114 of the energy absorber 111, the greater the compressive load required for crushing the energy absorber 111 becomes. Thus, instead of setting the insertion density of the binding threads 114 of the energy absorber 111 to be constant, the insertion density of the binding threads 114 may be changed according to the purpose along the direction of compressive load applied during the use of the energy absorber 111. For example, by reducing the insertion density of the binding threads 114 at the distal end 111a of the energy absorber 111 by comparison with that at the proximal end 111b of the energy absorber 111, the initial load of crushing can be reduced. The energy absorber 111 may be used as an actuation sensor for generating an actuation command for a vehicle airbag. In this case, the insertion density of the binding threads 114 may be varied at two or more stages according to the compression amount so that the energy absorber 111 has two or more energy absorption states corresponding to two or more values of collision velocity. Alternatively, the insertion density of the binding threads 114 may be increased at a middle section with respect to the direction of load applied to the energy absorber 111.

To vary the insertion density of the binding threads 114 along the direction of compressive load, the insertion pitch of the binding threads 114 may be varied in the compressive load direction. Alternatively, the insertion pitch along a direction perpendicular to the compressive load direction of the energy absorber 111 may be changed.

As long as the fiber bundles of the stack of fiber layers 113 at least have a biaxial structure, the bias threads 117a, 118a may be omitted so that the stack of fiber layers 113 has a biaxial structure with the x threads 115a and the y threads 116a.

The inclination angles of the bias threads 117a, 118a are not limited to forty-five degrees, but may be, for example, thirty degrees or sixty degrees.

In the above-mentioned embodiments, the binding threads 114 extend through the stack of fiber layers 113 and are folded in a U-shape. The binding threads 114 are fastened to the stack of fiber layers 113 while being prevented from coming off by the retaining threads 119. This configuration may be changed. For example, each time the binding threads 114 are caused to pass through the stack of fiber layers 113 along the thickness, the binding threads 114 may again be caused to pass through the stack of fiber layers 113 from the other side.

Instead of forming the stack of fiber layers 113 by arranging the x threads 115a, the y threads 116a, and the bias threads 117a, 118a using the frame 120, the stack of fiber layers 113 may be formed by overlaying fabric sheets. In this case, insertion of the binding threads 114 is performed in the same manner as the previous embodiment.

A fourth embodiment of the present invention will now be described. An energy absorber is made of fiber-reinforced resin. As shown in FIG. 18, a cross-section of the energy absorber 211 perpendicular to a compression direction when in use (direction indicated by arrow in FIG. 18) is varied along the compression direction. The magnitude of load needed for crushing changes depending on the position along the compression direction, accordingly.

The energy absorber 211 of this embodiment is formed such that the cross-sectional shape is continuously changed along the compression direction. The energy absorber 211 is in a state where a plate member is bent to have corners 212. The number of corners 212 at the proximal end 211b (right end as viewed in FIG. 18) is more than the number of corners 212 at the distal end 211a (left end as viewed in FIG. 18). The number of the corners 212 of the energy absorber 211 is four at the distal end 211a and eight at the proximal end 211b. That is, "the cross-sectional shape of the energy absorber 211 changing along compression direction" does not mean that the cross-section only changes in size while maintaining the shape, but means that, for example, the cross-section is rectangular at the distal end 211a of the energy absorber 211 and polygon having five or more sides at the proximal end 211b. The phrase also means that the number of bent sections is different at the distal end 211a from the proximal end 211b of the energy absorber 211.

As shown in FIGS. 18, 19(a), 19(b), and 19(c), the cross-section of the energy absorber 211 at a section corresponding to the distal end 211a when in use (FIG. 19(a)) is formed like a hat, and the cross-section at a section corresponding to the proximal end 211b when in use is formed to be two continuous hats (FIG. 19(c)). The cross-section at a middle portion of the energy absorber 211 (FIG. 19(b)) is shaped like a hat with a recess in the middle. The depth of the recess is gradually increased from the distal end 211a to the proximal end 211b. Specifically, the energy absorber 211 has the following shape. That is, in a member having a substantially channel-like cross-section, the upper and lower ends of the channel are bent outward by ninety-degrees and a groove 213 is formed in this member. The depth of the groove 213 is gradually increased from the distal end 211a to the proximal end 211b of the energy absorber 211. The groove 213 is formed by bending a middle portion of the member. The thickness of the plate portion of the energy absorber 211 is substantially constant. The width W and the height H of the entire energy absorber 211 (see FIG. 19(a)) are constant along the compression direction.

Reinforcing fibers of a fiber-reinforced resin forming the energy absorber 211 are formed of a stack of fiber layers. The stack of fiber layers includes compression direction fiber bundles, in which the fiber bundles of filament fibers are arranged to have a compression direction component of the energy absorber 211, and a ninety-degree fiber layer, in which the fiber bundles are arranged perpendicular to the compression direction of the energy absorber 211. The layers of the compression direction fiber bundles and the layers of the ninety-degree fiber bundles are alternately laminated. "Fiber bundles are arranged to have a compression direction component" means that the fiber bundles are arranged parallel to or slantly with respect to the compression direction.

Carbon fibers are used as the filament fibers forming the compression direction fiber bundles and the ninety-degree fiber bundles. The number of filaments in the carbon fiber is approximately from 6000 to 48000. A thermosetting resin is used as the matrix resin of the energy absorber 211. In this embodiment, an epoxy resin is used as the matrix resin.

The thickness of the plate portion of the energy absorber 211 is about 1.5 to 6 mm, and the thickness of a single layer of the compression direction fiber layers and the ninety-degree fiber layers is about 0.1 to 1.0 mm. The arrangement pitch of the compression direction fiber bundles and the ninety-degree fiber bundles is determined according to a target energy absorption amount as necessary.

The method for manufacturing the energy absorber 211 will now be described.

Figure 20A:
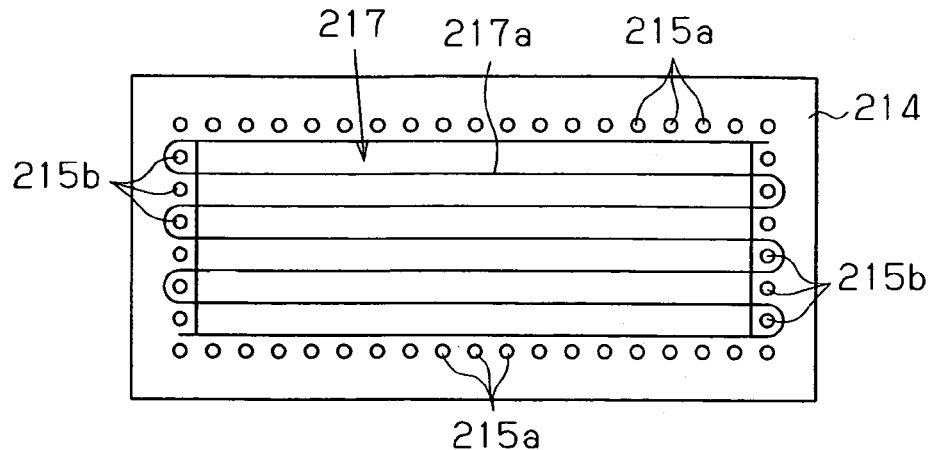
FIGS. 20(a) and 20(b) are plan views illustrating arrangements of fiber bundles of the energy absorber shown in FIG. 18.
Figure 20B:
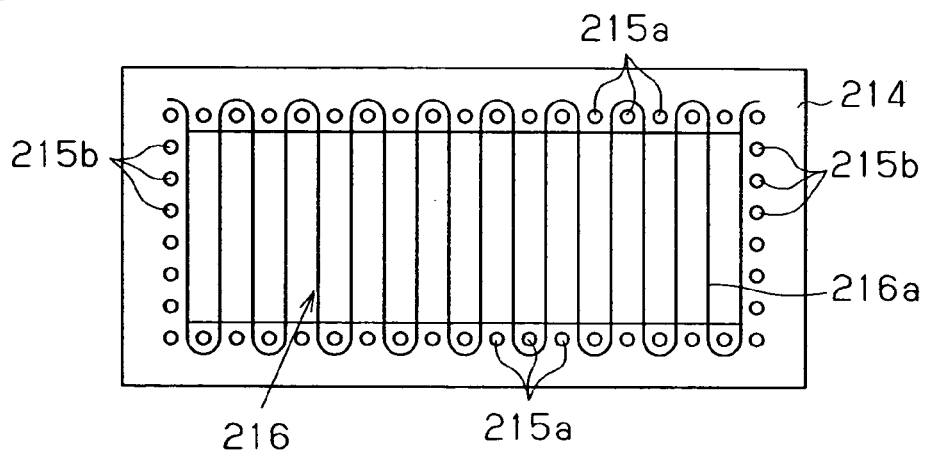

First, using a frame 214, a stack of fiber layers is formed. As shown in FIGS. 20(a) and 20(b), the frame 214 is rectangular. Supporting members, which are number of standing detachable pins 215a, 215b, are provided on the frame 214 at a predetermined pitch. The pitch of the pins 215a is determined according to the arrangement pitch of the compression direction fiber bundles 216a, and the pitch of the pins 215b is determined according to the arrangement pitch of the ninety-degree fiber bundles 217a. The frame 214 is formed to have a size that can form a stack of fiber layers greater than the size of the energy absorber 211 to be formed.

As shown in FIG. 20(b), the compression direction fiber bundles 216a are folded back while being engaged with the pins 215a, so that the compression direction fiber layers 216 are formed. Then, as shown in FIG. 20(a), the ninety-degree fiber bundles 217a are folded back while being engaged with the pins 215b and are arranged in a direction perpendicular to the compression direction, so that the ninety-degree fiber layers 217 are formed. Hereinafter, the arrangement of the compression direction fiber bundles 216a and the arrangement of the ninety-degree fiber bundles 217a are repeated for a predetermined number of times, thereby forming the stack of fiber layers. When arranging the compression direction fiber bundles 216a and the ninety-degree fiber bundles 217a, the fibers are opened. As a result, the compression direction fiber bundles 216a and the ninety-degree fiber bundles 217a are arranged in a flat state.

In FIGS. 20(a) and 20(b), the spaces between the compression direction fiber bundles 216a and the ninety-degree fiber bundles 217a are wide. However, at least the compression direction fiber bundles 216a are arranged such that each adjacent pair contact each other.

Thereafter, a shape maintaining process is performed. The process prevents the stack of fiber layers from being deformed when the compression direction fiber bundles 216a and the ninety-degree fiber bundles 217a, which have been laminated on the frame 214, are removed from the pins 215a, 215b, so that the stack of fiber layers is readily placed in a mold. In this embodiment, in the shape maintaining process, the binding threads 15 that extend through the stack of fiber layers along the thickness are inserted into the stack of fiber layers.

Subsequently, impregnation of resin to the stack of fiber layers and hardening of the resin are performed. The impregnation and hardening of resin are performed by, for example, a resin transfer molding (RTM) method.

Figure 21:
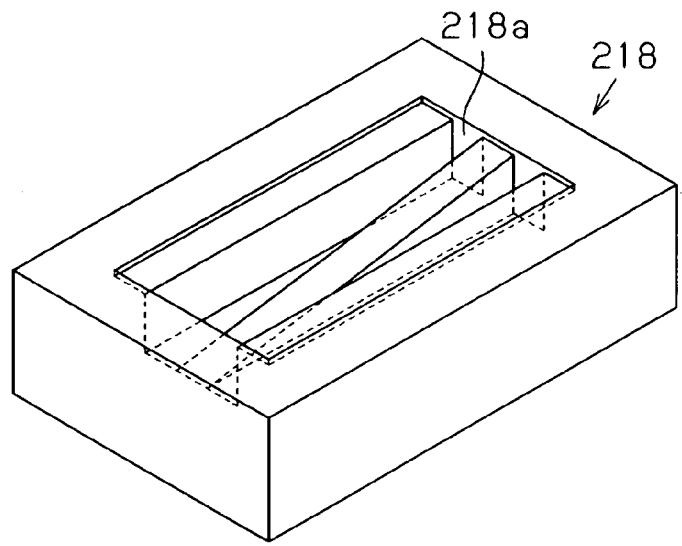
FIG. 21 is a perspective view illustrating a mold for manufacturing the energy absorber shown in FIG. 18.

A resin impregnation mold includes a lower die 218 and an upper die (see FIG. 4). As shown in FIG. 21, the lower die 218 is a female die and has a mold chamber 218a (cavity) that corresponds to the outer shape of the energy absorber 211. The upper die is a male die and has projections that are accommodated in the mold chamber 218a with a predetermined space between the inner surface of the mold chamber 218a and the upper die.

After performing the outline shaping process, the stack of fiber layers is placed in the mold chamber 218a of the lower die 218. Then, the projections of the upper die are inserted into the mold chamber 218a of the lower die 218, and the lower die 218 and the upper die are fastened to each other with the bolts. As a result, the stack of fiber layers is accommodated between the lower die 218 and the upper die.

Figure 22:
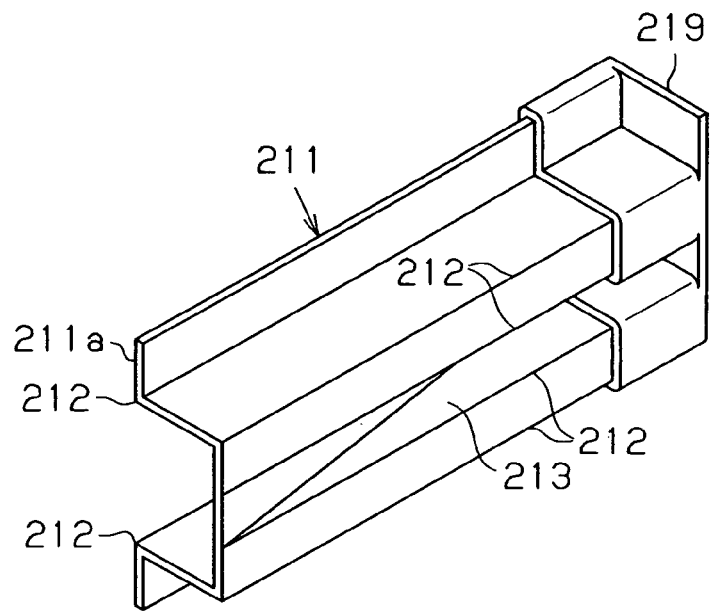
FIG. 22 is a perspective view illustrating an installed state of the energy absorber shown in FIG. 18.

The energy absorber 211 formed by the above method is, for example, used in a state shown in FIG. 22. That is, the energy absorber 211 is fixed to a portion that receives impact with the proximal end 211b being supported by a support 219. The energy absorber 211 receives compressive load from the distal end 211a.

The thickness of the plate portion of the energy absorber 211 is substantially constant, and the density of the compression direction fiber bundles 216a is substantially the same in different sections. Therefore, the smaller the cross-sectional area perpendicular to the compression direction, the smaller crushing load for crushing the energy absorber 211 becomes. In sections where the corners 212 are provided, the ninety-degree fiber bundles 217a are broken at the corners 212. This increases the load needed for crushing. Since the cross-sectional area of the energy absorber 211 is reduced toward the distal end 211a, the distal end 211a having a small cross-sectional area perpendicular to the compression direction is crushed by a small compressive load at an early stage of crushing. Since the number of the corners 212 is small, the distal end 211a of the energy absorber 211 is easily crushed by a low load. As the crushing progresses, portions that have greater cross-sectional areas and more fiber bundles are crushed, which increases the compressive load. Accordingly, the energy absorption amount is increased. That is, the initial load of the crushing of the energy absorber 211 is reduced and after crushing is started, crushing continues successively. The crushing is stably continued and energy is absorbed without abrupt increase in the compressive load required for crushing.

This embodiment provides the following advantages.

(21) The energy absorber 211 is formed of a fiber-reinforced resin, and a cross-sectional shape of the energy absorber 211 perpendicular to the compression direction when in use is varied along the compression direction. The magnitude of load needed for crushing changes depending on the position along the compression direction, accordingly. Therefore, at an early stage of the crushing, a portion of which a load required for crushing (crushing load) is small is first crushed. As the crushing progresses, portions of greater crushing load are crushed. As a result, reaction force of the energy absorber 211 is prevented from increasing at an early stage of crushing, also, the energy absorption amount is increased.

(22) The energy absorber 211 is formed such that the cross-sectional shape perpendicular to the compression direction is continuously changed along the compression direction. Therefore, by using the energy absorber 211 such that a section that requires a greater load for crushing is the proximal end 211b (base), reaction force of the energy absorber 211 is prevented from increasing at an early stage of crushing. Also, the energy absorber 211 stably absorbs energy.

(23) The cross-sectional shape of the energy absorber 211 perpendicular to the compression direction is a shape in which a plate member is bent to have corners 212. The number of corners 212 at the cross-section of the second end (proximal end 211b) is more than the number of corners 212 at the cross-section of the first end (distal end 211a). Therefore, by using a section having a greater number of corners 212 as the proximal end 211b, reaction force of the energy absorber 211 is prevented increasing at an early stage of the crushing. Also, the energy absorber 211 stably absorbs energy.

(24) The cross-section of the energy absorber 211 is configured as below. That is, in a member having a substantially channel-like cross-section, the ends of the channel are bent outward by ninety-degrees. The groove 213 is formed by bending a middle portion of the member. The member is formed such that the depth of the groove 213 is gradually increased toward the proximal end 211b. Therefore, it is easy to increase the cross-sectional area toward the proximal end 211b while maintaining the width W and the height H of the entire energy absorber 211 to be constant along the compression direction.

(25) In the shape maintaining process for impregnating the stack of fiber layers with resin, the binding threads that extend through the stack of fiber layers along the thickness are inserted into the stack of fiber layers. Thus, when the energy absorber 211 receives load and is crushed, the binding threads prevent exfoliation between layers in the compression direction fiber layers 216 and the ninety-degree fiber layers 217. The energy required for crushing is increased, accordingly. As a result, compared to a case where parts of the compression direction fiber layers 216 and the ninety-degree fiber layers 217 are temporarily fixed with, for example, adhesive, the energy absorption amount is increased.

(26) Each adjacent pair of the compression direction fiber bundles 216a are arranged to contact each other. Therefore, compared to a case where each adjacent pair of the compression direction fiber bundles 216a are separated by resin, the energy required for crushing is increased. Accordingly, the energy absorption amount is increased.

Figure 23:
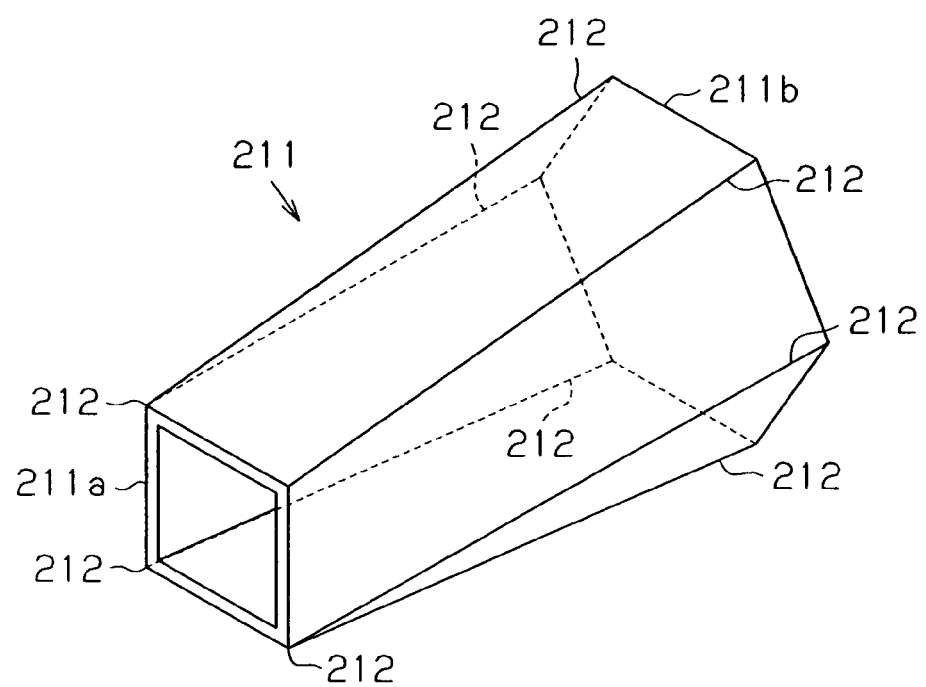
FIG. 23 is a perspective view illustrating an energy absorber according to a fifth embodiment of the present invention.

A fifth embodiment of the present invention will now be described with reference to FIG. 23. The fifth embodiment is different from the fourth embodiment in that the energy absorber 211 has a closed structure. The closed structure refers to a shape such as any tubular structure with or without ribs on the circumferential surface. Like or the same reference numerals are given to those components that are like or the same as the corresponding components of the fourth embodiment, and the explanation thereof is omitted.

The energy absorber 211 is formed tubular such that the distal end 211a is rectangular and the proximal end 211b is hexagonal when in use. That is, the energy absorber 211 has four corners at the distal end 211a and six corners at the proximal end 211b. The thickness of the energy absorber 211 is constant, and the cross-sectional area perpendicular to the compression direction increases toward the proximal end 211b.

The manufacturing method of the energy absorber 211 of the fifth embodiment is the same as that of the fourth embodiment up to the point where the stack of fiber layers is formed on the frame 214, the binding threads are inserted into the stack of fiber layers, and the shape maintaining process is performed. The resin impregnation mold for impregnating the stack of fiber layers with resin and hardening the resin is formed such that a mold chamber (cavity) defines the outer shape of the energy absorber 211. As an inner die, a prism shaped die having a shape corresponding to the inner shape of the energy absorber 211 is used. Thereafter, the stack of fiber layers is wrapped about the inner die, and the inner die is placed in the mold chamber of the resin impregnation mold. After the stack of fiber layers is impregnated with resin, the resin is hardened.

As in the fourth embodiment, the energy absorber 211 of the fifth embodiment is used such that a section of a greater number of the corners 212 is at the proximal end 211b. In addition to the same advantages as the advantages (21), (23), (25) and (26) of the fourth embodiment, the fifth embodiment has the following advantages.

(27) Although the energy absorber 211 of the fifth embodiment has a simple structure, buckling is less likely to occur compared to a shape formed by bending a plate member without a closed structure since the energy absorber 211 has a closed structure.

(28) Although having a closed structure, since all the corners 212 project outward the energy absorber 211 is easier to manufacture compared to a case where some corners protrude inward.

The above-described embodiments may be embodied in the following forms.

Figure 24:
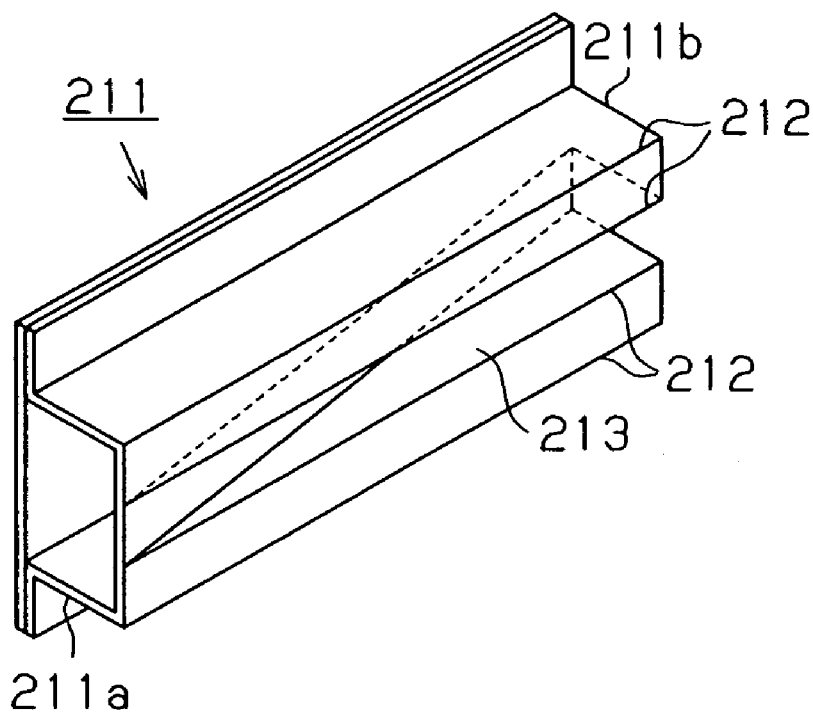
FIG. 24 is a perspective view showing an energy absorber according to a modification of the fourth embodiment.

The configuration of the energy absorber 211 is not limited to the ones described in the fourth and fifth embodiments as long as the cross-section perpendicular to the compression direction in use changes along the compression direction, and the load required for crushing varies along the compression direction. For example, as shown in FIG. 24, the energy absorber 211 may be formed by combining a member having the shape presented in the fourth embodiment and a flat plate.

In a case where the energy absorber 211 has a wavy cross-section perpendicular to the compression direction, the number of the waves may be less at the distal end 211a than at the proximal end 211b.

In a case where the energy absorber 211 is formed by bending a plate member to have corners, the configuration of the energy absorber 211 may be varied as long as the number of the corners in the cross-section at the second end (proximal end 211b) is more than that at the first end (distal end 211a). For example, only one corner may be provided at the second end (proximal end 211b).

In a case where the energy absorber 211 is formed by bending a plate member to have corners, the energy absorber 211 may be configured such that no corners are provided in the cross-section at the first end (distal end 211a), and one or more corners are provided in the cross-section at the second corner (proximal end 211b).

The configuration of the energy absorber 211 is not limited to that in which the cross-sectional shape perpendicular to the compression direction is continuously changed along the compression direction. For example, in the fourth embodiment, the groove 213 does not need to extend from the distal end 211a of the energy absorber 211, but may extend from a middle section in the compression direction.

Figure 25:
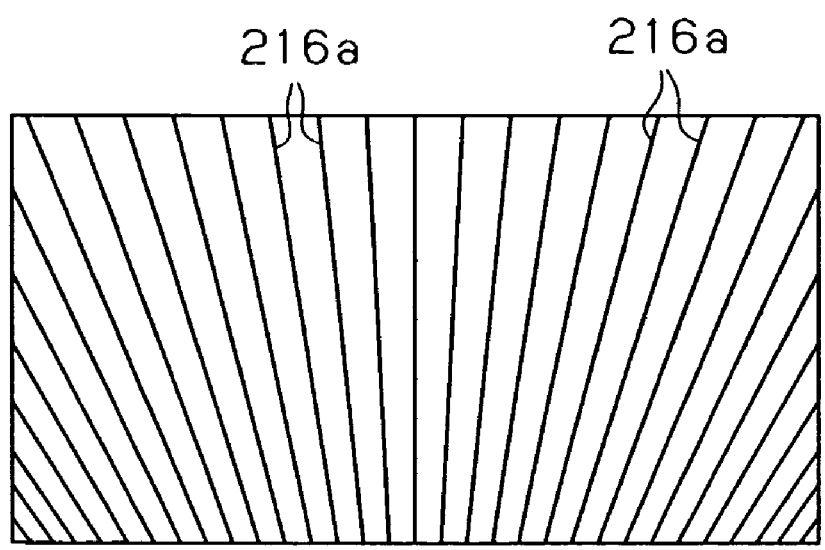
FIG. 25 is a diagram showing the arrangement of compression direction fiber bundles according to another modification of the fourth and fifth embodiments.
Figure 26:
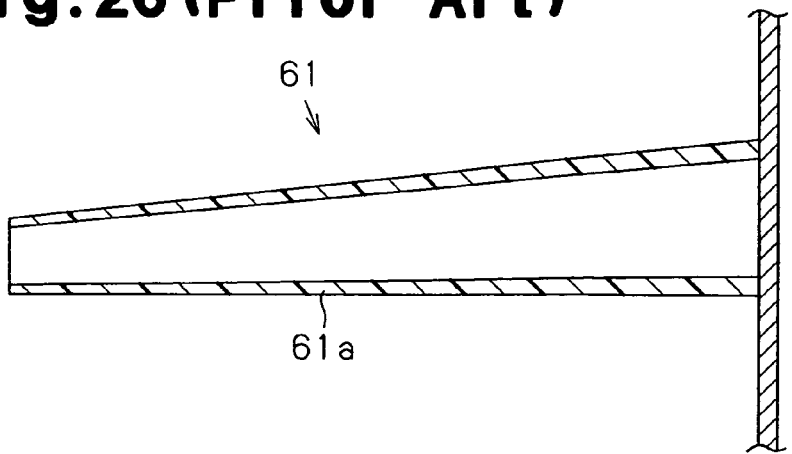
FIG. 26 is a cross-sectional view illustrating a conventional energy absorber.
Figure 27:
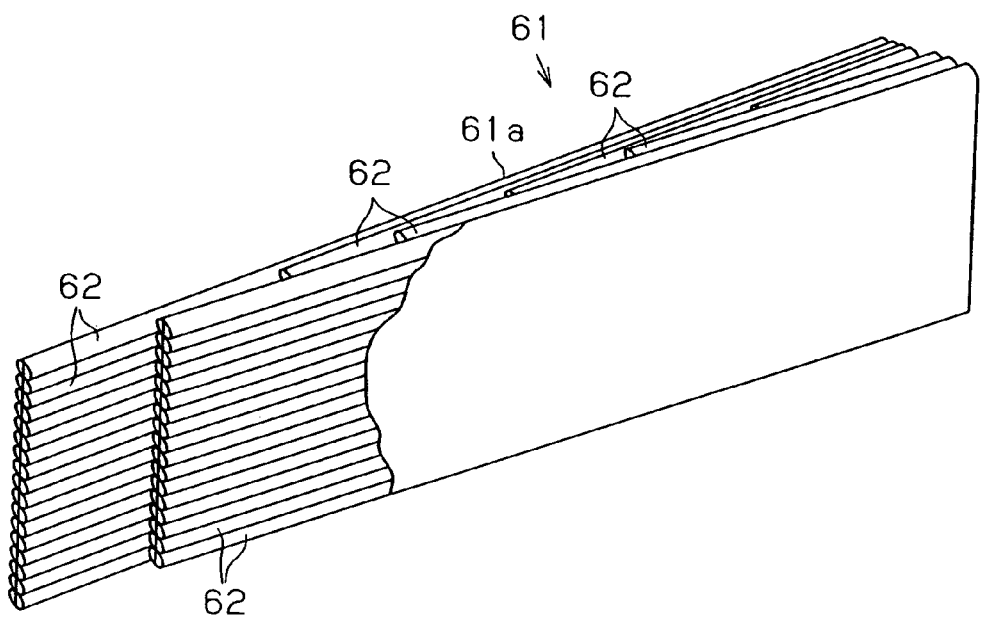
FIG. 27 is a partial perspective view illustrating another conventional energy absorber.
Figure 28:
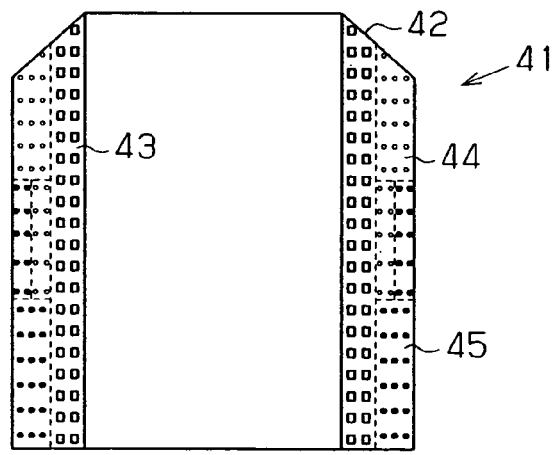
FIG. 28 is a cross-sectional view illustrating another conventional energy absorber.

The thickness of the plate member of the energy absorber 211 does not need to be constant, but may be increased toward an end that corresponds to the proximal end 211b in use. To increase the thickness toward the proximal end 211b, when forming the stack of fiber layers using the frame 214, the density of the compression direction fiber bundles 216a may be gradually reduced from the second end (proximal end 211b) to the first end (distal end 211a) along the compression direction of the energy absorber 211 as shown in FIG. 25. In this case, most of the compression direction fiber bundles 216a are not parallel to but inclined with respect to the compression direction of the energy absorber 211. The density of the ninety-degree fiber bundles 217a may be gradually decreased from the second end (proximal end 211b) to the first end (distal end 211a) along the compression direction of the energy absorber 211. The density of both of the compression direction fiber bundles 216a and the ninety-degree fiber bundles 217a may be gradually reduced from the second end (proximal end 211b) to the first end (distal end 211a) along the compression direction of the energy absorber 211.

In a case where the plate member of the energy absorber 211 has a constant thickness, the density of at least one of the compression direction fiber bundles 216a and the ninety-degree fiber bundles 217a forming the stack of fiber layers may be gradually reduced from the first end to the second end along the compression direction of the energy absorber 211. In this case also, since the density of the fiber bundles is increased at the proximal end 211b of the energy absorber 211, the load required for crushing is increased. This permits the energy absorber 211 to effectively absorb energy.

Instead of forming the stack of fiber layers by arranging the compression direction fiber bundles 216a and the ninety-degree fiber bundles 217a using the frame 214, the stack of fiber layers may be formed by overlaying fabric sheets. In this case, insertion of the binding threads is performed in the same manner as the previous embodiments.

When manufacturing the tubular energy absorber 211, ends of the flat stack of fiber layers formed using the frame 214 may be overlaid on each other and the overlaid sections may be coupled to each other by sewing with a sewing machine or by using the binding threads 15 and the retaining threads 119. In this case, the tubular energy absorber 211 is placed on a die having a shape corresponding to the energy absorber 211 and impregnated with resin.

As long as the fiber bundles of the stack of fiber layers at least has a biaxial structure, fiber bundles (bias threads) may be provided, which intersect both of the compression direction fiber bundles 216a and the ninety-degree fiber bundles 217a.

Fiber bundles having varied sizes may be used for forming the compression direction fiber bundles 216a and the ninety-degree fiber bundles 217a.

When a thermoplastic resin is used as the matrix resin of the energy absorber 211, the fiber bundles may be entirely impregnated with the thermoplastic resin. In this case, after arranging the compression direction fiber bundles 216a and the ninety-degree fiber bundles 217a, the fiber bundles 216a, 217a are integrated to form a plate member. The plate member is set in a mold, and is then heated and softened to form the energy absorber 211.

The present examples and embodiments are to be considered as illustrative and not restrictive and the invention is not to be limited to the details given herein, but may be modified within the scope and equivalence of the appended claims.

The invention claimed is:

1. An energy absorber comprising:
a first elongated body having a first end and a second end; and
a second elongated body having a first end and a second end;
wherein the first and second elongated bodies being formed of fiber-reinforced resin which includes:
compression direction fiber layers formed of bundles of filament fibers extending parallel to or inclined relative to a longitudinal axis of the body; and
intersecting fiber layers formed of bundles of filament fibers extending perpendicular to the longitudinal axis of the body;
wherein the compression direction fiber layers and intersecting fiber layers are alternatively stacked to form a laminated structure bound together by binding threads which are looped through the entire thickness of the laminated structure and are secured against one side of the laminated structure by retaining threads;
wherein at least one of the first and second elongated bodies has a wavy cross-section;
wherein the first elongated body is attached to the second elongated body along its length by thickness threads to form a tubular body; and
wherein the tubular body is impregnated in a resin.

2. The energy absorber according to claim 1, wherein the thickness of the fiber-reinforced resin is constant.

3. The energy absorber according to claim 1, wherein the thickness of the fiber-reinforced resin gradually increases from the first ends to the second ends.

4. The energy absorber according to claim 1, wherein the fiber volume content of the fiber-reinforced resin is substantially constant.

5. The energy absorber according to claim 1, wherein the fiber volume content of the fiber-reinforced resin increases from the first ends toward the second ends.

6. The energy absorber according to claim 1, wherein the compression direction fiber layers are formed of bundles of filament fibers extending biaxially relative to the longitudinal axis of the bodies.

7. The energy absorber according to claim 1, wherein an insertion density of the binding threads is >28,000 threads/m$^2$.

8. The energy absorber according to claim 1, wherein an insertion density of the binding threads increases from the first ends to the second ends.

9. The energy absorber according to claim 1, wherein the first elongated body has a hat-shaped cross-section and the second elongated body is a flat plate; and
wherein the first elongated body is attached to the second elongated body to form a tubular body.

10. The energy absorber according to claim 1, wherein the first and second elongated bodies have semicircular cross-sections with ribs extending from each end of the semicircle; and
wherein the first elongated body is attached to the second elongated body to form a tubular body.

11. The energy absorber according to claim 1, wherein a cross-section of the first elongated body gradually changes from a hat-shape at the first end to a shape of two continuous hats at the second end and the second elongated body is a flat plate; and
wherein the first elongated body is attached to the second elongated body to form a tubular body.

12. A energy absorber comprising;
At least two elongated bodies having a first end and a second end, the elongated bodies being formed of fiber-reinforced resin which includes:
compression direction fiber layers formed of bundles of filament fibers extending parallel to or inclined relative to a longitudinal axis of the body; and
intersecting fiber layers formed of bundles of filament fibers extending perpendicular to the longitudinal axis of the body;
wherein the compression direction fiber layers and intersecting fiber layers are alternatively stacked to form a laminated structure bound together by binding threads which are looped through the entire thickness of the laminated structure and are secured against one side of the laminated structure by retaining threads;
wherein the elongated bodies are bound by thickness threads to form a plate shape structure; and
wherein the plate shape structure is impregnated in a resin.

13. A energy absorber according to claim 12 wherein the elongated bodies have a closed and flat structure.

14. An energy absorber comprising:
an elongated body having a first end and a second end, the elongated body being formed of fiber-reinforced resin which includes:
compression direction fiber layers formed of bundles of filament fibers extending parallel to or inclined relative to a longitudinal axis of the body; and
intersecting fiber layers formed of bundles of filament fibers extending perpendicular to the longitudinal axis of the body;
wherein the compression direction fiber layers and intersecting fiber layers are alternatively stacked to form a laminated structure bound together by binding threads which are looped through the entire thickness of the laminated structure and are secured against one side of the laminated structure by retaining threads;

wherein a cross-section of the elongated body continually changes from a square at the first end to a hexagon at the second end; and wherein the laminated structure is impregnated in a resin.

15. The energy absorber according to claim 1, wherein the density of fibers in at least one of the compression direction fiber layers or the intersecting fiber layers increases from the first end to the second end.

16. The energy absorber according to claim 12, wherein the density of fibers in at least one of the compression direction fiber layers or the intersecting fiber layers increases from the first end to the second end.

17. The energy absorber according to claim 14, wherein the density of fibers in at least one of the compression direction fiber layers or the intersecting fiber layers increases from the first end to the second end.

* * * * *